United States Patent
Mullis

(10) Patent No.: US 12,549,701 B2
(45) Date of Patent: Feb. 10, 2026

(54) SYSTEM AND METHODS FOR CALIBRATION OF AN ARRAY CAMERA

(71) Applicant: Adeia Imaging LLC, San Jose, CA (US)

(72) Inventor: Robert Mullis, Santa Cruz, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/634,779

(22) Filed: Apr. 12, 2024

(65) Prior Publication Data

US 2024/0348765 A1  Oct. 17, 2024

Related U.S. Application Data

(63) Continuation of application No. 18/161,317, filed on Jan. 30, 2023, now Pat. No. 11,985,293, which is a
(Continued)

(51) Int. Cl.
*H04N 17/00* (2006.01)
*G06T 7/80* (2017.01)
(Continued)

(52) U.S. Cl.
CPC ............. *H04N 13/246* (2018.05); *G06T 7/85* (2017.01); *H04N 13/243* (2018.05);
(Continued)

(58) Field of Classification Search
CPC ...... H04N 17/002; H04N 17/02; H04N 17/00; H04N 13/0246; H04N 13/0242;
(Continued)

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| CN | 1619358 A | 5/2005 |
| CN | 1669332 A | 9/2005 |

(Continued)

OTHER PUBLICATIONS

Extended European Search Report for European Application No. 23177057.9, Search completed Dec. 4, 2023, Mailed Dec. 15, 2023 14 Pgs.

(Continued)

*Primary Examiner* — Sherrie Hsia
(74) *Attorney, Agent, or Firm* — KPPB LLP

(57) ABSTRACT

Systems and methods for calibrating an array camera are disclosed. Systems and methods for calibrating an array camera in accordance with embodiments of this invention include the capturing of an image of a test pattern with the array camera such that each imaging component in the array camera captures an image of the test pattern. The image of the test pattern captured by a reference imaging component is then used to derive calibration information for the reference component. A corrected image of the test pattern for the reference component is then generated from the calibration information and the image of the test pattern captured by the reference imaging component. The corrected image is then used with the images captured by each of the associate imaging components associated with the reference component to generate calibration information for the associate imaging components.

19 Claims, 5 Drawing Sheets

Related U.S. Application Data continuation of application No. 17/653,267, filed on Mar. 2, 2022, now Pat. No. 11,570,423, which is a continuation of application No. 17/208,618, filed on Mar. 22, 2021, now Pat. No. 11,272,161, which is a continuation of application No. 16/785,914, filed on Feb. 10, 2020, now Pat. No. 10,958,892, which is a continuation of application No. 16/290,672, filed on Mar. 1, 2019, now Pat. No. 10,560,684, which is a continuation of application No. 15/987,768, filed on May 23, 2018, now Pat. No. 10,225,543, which is a continuation of application No. 14/841,651, filed on Aug. 31, 2015, now Pat. No. 9,986,224, which is a continuation of application No. 14/519,005, filed on Oct. 20, 2014, now Pat. No. 9,124,864, which is a continuation of application No. 13/792,143, filed on Mar. 10, 2013, now Pat. No. 8,866,912.

(51) Int. Cl.
| | | |
|---|---|---|
| *H04N 13/243* | (2018.01) | |
| *H04N 13/246* | (2018.01) | |
| *H04N 13/257* | (2018.01) | |
| *H04N 13/282* | (2018.01) | |
| *H04N 17/02* | (2006.01) | |
| *H04N 23/667* | (2023.01) | |
| *H04N 23/951* | (2023.01) | |

(52) U.S. Cl.
CPC ......... *H04N 13/257* (2018.05); *H04N 13/282* (2018.05); *H04N 17/002* (2013.01); *H04N 17/02* (2013.01); *H04N 23/667* (2023.01); *H04N 23/951* (2023.01); *G06T 2207/10012* (2013.01); *G06T 2207/10024* (2013.01); *G06T 2207/20048* (2013.01)

(58) Field of Classification Search
CPC ........... H04N 13/0257; H04N 13/0282; H04N 5/23232; H04N 5/23245; G06T 7/85; G06T 2207/10012; G06T 2207/10024; G06T 2207/20048; G06T 5/006
USPC ........ 348/187, 188, 175, 218.1, 135, 47, 48; 700/258, 259; 702/104, 116; 382/103, 382/106, 107, 153, 154, 284
See application file for complete search history.

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 4,652,909 A | 3/1987 | Glenn |
| 4,888,645 A | 12/1989 | Mitchell et al. |
| 4,899,060 A | 2/1990 | Lischke |
| 4,962,425 A | 10/1990 | Rea |
| 5,005,083 A | 4/1991 | Grage et al. |
| 5,070,414 A | 12/1991 | Tsutsumi |
| 5,144,448 A | 9/1992 | Hornbaker et al. |
| 5,157,499 A | 10/1992 | Oguma et al. |
| 5,325,449 A | 6/1994 | Burt et al. |
| 5,327,125 A | 7/1994 | Iwase et al. |
| 5,463,464 A | 10/1995 | Ladewski |
| 5,488,674 A | 1/1996 | Burt et al. |
| 5,629,524 A | 5/1997 | Stettner et al. |
| 5,638,461 A | 6/1997 | Fridge |
| 5,757,425 A | 5/1998 | Barton et al. |
| 5,793,900 A | 8/1998 | Nourbakhsh et al. |
| 5,801,919 A | 9/1998 | Griencewic |
| 5,808,350 A | 9/1998 | Jack et al. |
| 5,832,312 A | 11/1998 | Rieger et al. |
| 5,833,507 A | 11/1998 | Woodgate et al. |
| 5,880,691 A | 3/1999 | Fossum et al. |
| 5,911,008 A | 6/1999 | Niikura et al. |
| 5,933,190 A | 8/1999 | Dierickx et al. |
| 5,963,664 A | 10/1999 | Kumar et al. |
| 5,973,844 A | 10/1999 | Burger |
| 6,002,743 A * | 12/1999 | Telymonde ........... G06T 1/0007 378/98.8 |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,095,989 A | 8/2000 | Hay et al. |
| 6,097,394 A | 8/2000 | Levoy et al. |
| 6,124,974 A | 9/2000 | Burger |
| 6,130,786 A | 10/2000 | Osawa et al. |
| 6,137,100 A | 10/2000 | Fossum et al. |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,172,352 B1 | 1/2001 | Liu |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,340,994 B1 | 1/2002 | Margulis et al. |
| 6,358,862 B1 | 3/2002 | Ireland et al. |
| 6,373,518 B1 | 4/2002 | Sogawa |
| 6,419,638 B1 | 7/2002 | Hay et al. |
| 6,443,579 B1 | 9/2002 | Myers |
| 6,445,815 B1 | 9/2002 | Sato |
| 6,476,805 B1 | 11/2002 | Shum et al. |
| 6,477,260 B1 | 11/2002 | Shimomura |
| 6,483,949 B1 | 11/2002 | Yokoyama et al. |
| 6,502,097 B1 | 12/2002 | Chan et al. |
| 6,525,302 B2 | 2/2003 | Dowski, Jr. et al. |
| 6,552,742 B1 | 4/2003 | Seta |
| 6,563,537 B1 | 5/2003 | Kawamura et al. |
| 6,571,466 B1 | 6/2003 | Glenn et al. |
| 6,603,513 B1 | 8/2003 | Berezin |
| 6,611,289 B1 | 8/2003 | Yu et al. |
| 6,627,896 B1 | 9/2003 | Hashimoto et al. |
| 6,628,330 B1 | 9/2003 | Lin |
| 6,628,845 B1 | 9/2003 | Stone et al. |
| 6,635,941 B2 | 10/2003 | Suda |
| 6,639,596 B1 | 10/2003 | Shum et al. |
| 6,647,142 B1 | 11/2003 | Beardsley |
| 6,657,218 B2 | 12/2003 | Noda |
| 6,671,399 B1 | 12/2003 | Berestov |
| 6,674,892 B1 | 1/2004 | Melen |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,788,338 B1 | 9/2004 | Dinev et al. |
| 6,795,253 B2 | 9/2004 | Shinohara |
| 6,801,653 B1 | 10/2004 | Wu et al. |
| 6,819,328 B1 | 11/2004 | Moriwaki et al. |
| 6,819,358 B1 | 11/2004 | Kagle et al. |
| 6,833,863 B1 | 12/2004 | Clemens |
| 6,879,735 B1 | 4/2005 | Portniaguine et al. |
| 6,897,454 B2 | 5/2005 | Sasaki et al. |
| 6,903,770 B1 | 6/2005 | Kobayashi et al. |
| 6,909,121 B2 | 6/2005 | Nishikawa |
| 6,917,702 B2 | 7/2005 | Beardsley |
| 6,927,922 B2 | 8/2005 | George et al. |
| 6,958,862 B1 | 10/2005 | Joseph |
| 6,985,175 B2 | 1/2006 | Iwai et al. |
| 7,015,954 B1 | 3/2006 | Foote et al. |
| 7,085,409 B2 | 8/2006 | Sawhney et al. |
| 7,139,412 B2 † | 11/2006 | Kato |
| 7,161,614 B1 | 1/2007 | Yamashita et al. |
| 7,199,348 B2 | 4/2007 | Olsen et al. |
| 7,206,449 B2 | 4/2007 | Raskar et al. |
| 7,215,364 B2 | 5/2007 | Wachtel et al. |
| 7,235,785 B2 | 6/2007 | Hornback et al. |
| 7,245,761 B2 | 7/2007 | Swaminathan et al. |
| 7,262,799 B2 | 8/2007 | Suda |

(56) References Cited

U.S. PATENT DOCUMENTS

| | | | |
|---|---|---|---|
| 7,292,735 B2 | 11/2007 | Blake et al. | |
| 7,295,697 B1 | 11/2007 | Satoh | |
| 7,333,651 B1 | 2/2008 | Kim et al. | |
| 7,369,165 B2 | 5/2008 | Bosco et al. | |
| 7,391,572 B2 | 6/2008 | Jacobowitz et al. | |
| 7,408,725 B2 | 8/2008 | Sato | |
| 7,425,984 B2 | 9/2008 | Chen et al. | |
| 7,430,312 B2 | 9/2008 | Gu | |
| 7,471,765 B2 | 12/2008 | Jaffray et al. | |
| 7,496,293 B2 | 2/2009 | Shamir et al. | |
| 7,564,019 B2 | 7/2009 | Olsen et al. | |
| 7,599,547 B2 | 10/2009 | Sun et al. | |
| 7,606,484 B1 | 10/2009 | Richards et al. | |
| 7,620,265 B1 | 11/2009 | Wolff et al. | |
| 7,633,511 B2 | 12/2009 | Shum et al. | |
| 7,639,435 B2 | 12/2009 | Chiang | |
| 7,639,838 B2 | 12/2009 | Nims | |
| 7,646,549 B2 | 1/2010 | Zalevsky et al. | |
| 7,657,090 B2 | 2/2010 | Omatsu et al. | |
| 7,667,824 B1 | 2/2010 | Moran | |
| 7,675,080 B2 | 3/2010 | Boettiger | |
| 7,675,681 B2 | 3/2010 | Tomikawa et al. | |
| 7,706,634 B2 * | 4/2010 | Schmitt | H04N 5/32 382/294 |
| 7,723,662 B2 | 5/2010 | Levoy et al. | |
| 7,738,013 B2 | 6/2010 | Galambos et al. | |
| 7,741,620 B2 | 6/2010 | Doering et al. | |
| 7,782,364 B2 | 8/2010 | Smith | |
| 7,826,153 B2 | 11/2010 | Hong | |
| 7,840,067 B2 | 11/2010 | Shen et al. | |
| 7,912,673 B2 | 3/2011 | Hébert et al. | |
| 7,924,321 B2 | 4/2011 | Nayar et al. | |
| 7,956,871 B2 | 6/2011 | Fainstain et al. | |
| 7,965,314 B1 | 6/2011 | Miller et al. | |
| 7,973,834 B2 | 7/2011 | Yang | |
| 7,986,018 B2 | 7/2011 | Rennie | |
| 7,990,447 B2 | 8/2011 | Honda et al. | |
| 8,000,498 B2 | 8/2011 | Shih et al. | |
| 8,013,904 B2 * | 9/2011 | Tan | H04N 17/002 348/222.1 |
| 8,027,531 B2 | 9/2011 | Wilburn et al. | |
| 8,044,994 B2 | 10/2011 | Vetro et al. | |
| 8,055,466 B2 | 11/2011 | Bryll | |
| 8,077,245 B2 | 12/2011 | Adamo et al. | |
| 8,089,515 B2 | 1/2012 | Chebil et al. | |
| 8,098,297 B2 | 1/2012 | Crisan et al. | |
| 8,098,304 B2 | 1/2012 | Pinto et al. | |
| 8,106,949 B2 | 1/2012 | Tan et al. | |
| 8,111,910 B2 | 2/2012 | Tanaka | |
| 8,126,279 B2 | 2/2012 | Marcellin et al. | |
| 8,130,120 B2 | 3/2012 | Kawabata et al. | |
| 8,131,097 B2 | 3/2012 | Lelescu et al. | |
| 8,149,323 B2 | 4/2012 | Li et al. | |
| 8,164,629 B1 | 4/2012 | Zhang | |
| 8,169,486 B2 | 5/2012 | Corcoran et al. | |
| 8,180,145 B2 | 5/2012 | Wu et al. | |
| 8,189,065 B2 | 5/2012 | Georgiev et al. | |
| 8,189,089 B1 | 5/2012 | Georgiev et al. | |
| 8,194,296 B2 | 6/2012 | Compton et al. | |
| 8,212,914 B2 | 7/2012 | Chiu | |
| 8,213,711 B2 | 7/2012 | Tam | |
| 8,231,814 B2 | 7/2012 | Duparre | |
| 8,242,426 B2 | 8/2012 | Ward et al. | |
| 8,244,027 B2 | 8/2012 | Takahashi | |
| 8,244,058 B1 | 8/2012 | Intwala et al. | |
| 8,254,668 B2 | 8/2012 | Mashitani et al. | |
| 8,279,325 B2 | 10/2012 | Pitts et al. | |
| 8,280,194 B2 | 10/2012 | Wong et al. | |
| 8,284,240 B2 | 10/2012 | Saint-Pierre et al. | |
| 8,289,409 B2 | 10/2012 | Chang | |
| 8,289,440 B2 | 10/2012 | Pitts et al. | |
| 8,290,358 B1 | 10/2012 | Georgiev | |
| 8,294,099 B2 | 10/2012 | Blackwell, Jr. | |
| 8,294,754 B2 | 10/2012 | Jung et al. | |
| 8,300,085 B2 | 10/2012 | Yang et al. | |
| 8,305,456 B1 | 11/2012 | McMahon | |
| 8,315,476 B1 | 11/2012 | Georgiev et al. | |
| 8,345,144 B1 | 1/2013 | Georgiev et al. | |
| 8,360,574 B2 | 1/2013 | Ishak et al. | |
| 8,400,555 B1 | 3/2013 | Georgiev et al. | |
| 8,406,562 B2 | 3/2013 | Bassi et al. | |
| 8,411,146 B2 | 4/2013 | Twede | |
| 8,416,282 B2 | 4/2013 | Lablans | |
| 8,421,846 B2 | 4/2013 | Nelson et al. | |
| 8,446,492 B2 | 5/2013 | Nakano et al. | |
| 8,447,128 B2 | 5/2013 | Kameyama | |
| 8,456,517 B2 | 6/2013 | Spektor et al. | |
| 8,493,496 B2 | 7/2013 | Freedman et al. | |
| 8,514,291 B2 | 8/2013 | Chang | |
| 8,514,491 B2 | 8/2013 | Duparre | |
| 8,541,730 B2 | 9/2013 | Inuiya | |
| 8,542,933 B2 | 9/2013 | Venkataraman et al. | |
| 8,553,093 B2 | 10/2013 | Wong et al. | |
| 8,559,705 B2 | 10/2013 | Ng | |
| 8,559,756 B2 | 10/2013 | Georgiev et al. | |
| 8,565,547 B2 | 10/2013 | Strandemar | |
| 8,576,302 B2 | 11/2013 | Yoshikawa | |
| 8,577,183 B2 | 11/2013 | Robinson | |
| 8,581,995 B2 | 11/2013 | Lin et al. | |
| 8,587,679 B2 | 11/2013 | Knee | |
| 8,619,082 B1 | 12/2013 | Ciurea et al. | |
| 8,648,918 B2 | 2/2014 | Kauker et al. | |
| 8,648,919 B2 | 2/2014 | Mantzel et al. | |
| 8,655,052 B2 | 2/2014 | Spooner et al. | |
| 8,682,107 B2 | 3/2014 | Yoon et al. | |
| 8,687,087 B2 | 4/2014 | Pertsel et al. | |
| 8,692,893 B2 | 4/2014 | McMahon | |
| 8,749,620 B1 | 6/2014 | Knight et al. | |
| 8,754,941 B1 | 6/2014 | Sarwari et al. | |
| 8,773,536 B1 | 7/2014 | Zhang | |
| 8,780,113 B1 | 7/2014 | Ciurea et al. | |
| 8,804,255 B2 | 8/2014 | Duparre | |
| 8,823,813 B2 | 9/2014 | Mantzel et al. | |
| 8,830,375 B2 | 9/2014 | Ludwig | |
| 8,831,367 B2 | 9/2014 | Venkataraman et al. | |
| 8,831,377 B2 | 9/2014 | Pitts et al. | |
| 8,836,793 B1 | 9/2014 | Kriesel et al. | |
| 8,842,201 B2 | 9/2014 | Tajiri | |
| 8,854,462 B2 | 10/2014 | Herbin et al. | |
| 8,861,089 B2 | 10/2014 | Duparre | |
| 8,866,912 B2 | 10/2014 | Mullis | |
| 8,866,920 B2 | 10/2014 | Venkataraman et al. | |
| 8,866,951 B2 | 10/2014 | Keelan | |
| 8,878,950 B2 | 11/2014 | Lelescu et al. | |
| 8,885,059 B1 | 11/2014 | Venkataraman et al. | |
| 8,885,922 B2 | 11/2014 | Ito et al. | |
| 8,896,594 B2 | 11/2014 | Xiong et al. | |
| 8,896,719 B1 | 11/2014 | Venkataraman et al. | |
| 8,902,321 B2 | 12/2014 | Venkataraman et al. | |
| 8,928,793 B2 | 1/2015 | McMahon | |
| 8,977,038 B2 | 3/2015 | Tian et al. | |
| 9,001,226 B1 | 4/2015 | Ng et al. | |
| 9,019,426 B2 | 4/2015 | Han et al. | |
| 9,025,894 B2 | 5/2015 | Venkataraman et al. | |
| 9,025,895 B2 | 5/2015 | Venkataraman et al. | |
| 9,030,528 B2 | 5/2015 | Pesach et al. | |
| 9,031,335 B2 | 5/2015 | Venkataraman et al. | |
| 9,031,342 B2 | 5/2015 | Venkataraman | |
| 9,031,343 B2 | 5/2015 | Venkataraman | |
| 9,036,928 B2 | 5/2015 | Venkataraman | |
| 9,036,931 B2 | 5/2015 | Venkataraman et al. | |
| 9,041,823 B2 | 5/2015 | Venkataraman et al. | |
| 9,041,824 B2 | 5/2015 | Lelescu et al. | |
| 9,041,829 B2 | 5/2015 | Venkataraman et al. | |
| 9,042,667 B2 | 5/2015 | Venkataraman et al. | |
| 9,047,684 B2 | 6/2015 | Lelescu et al. | |
| 9,049,367 B2 | 6/2015 | Venkataraman et al. | |
| 9,055,233 B2 | 6/2015 | Venkataraman et al. | |
| 9,060,120 B2 | 6/2015 | Venkataraman et al. | |
| 9,060,124 B2 | 6/2015 | Venkataraman et al. | |
| 9,077,893 B2 | 7/2015 | Venkataraman et al. | |
| 9,094,661 B2 | 7/2015 | Venkataraman et al. | |
| 9,100,586 B2 | 8/2015 | McMahon et al. | |
| 9,100,635 B2 | 8/2015 | Duparre et al. | |

(56) References Cited

U.S. PATENT DOCUMENTS

| | | |
|---|---|---|
| 9,123,117 B2 | 9/2015 | Ciurea et al. |
| 9,123,118 B2 | 9/2015 | Ciurea et al. |
| 9,124,815 B2 | 9/2015 | Venkataraman et al. |
| 9,124,831 B2 | 9/2015 | Mullis |
| 9,124,864 B2 | 9/2015 | Mullis |
| 9,128,228 B2 | 9/2015 | Duparre |
| 9,129,183 B2 | 9/2015 | Venkataraman et al. |
| 9,129,377 B2 | 9/2015 | Ciurea et al. |
| 9,131,128 B2 | 9/2015 | Meyers et al. |
| 9,143,711 B2 | 9/2015 | McMahon |
| 9,147,254 B2 | 9/2015 | Florian et al. |
| 9,185,276 B2 | 11/2015 | Rodda et al. |
| 9,188,765 B2 | 11/2015 | Venkataraman et al. |
| 9,191,580 B2 | 11/2015 | Venkataraman et al. |
| 9,197,821 B2 | 11/2015 | McMahon |
| 9,210,392 B2 | 12/2015 | Nisenzon et al. |
| 9,210,404 B2 † | 12/2015 | Hall |
| 9,214,013 B2 | 12/2015 | Venkataraman et al. |
| 9,235,898 B2 | 1/2016 | Venkataraman et al. |
| 9,235,900 B2 | 1/2016 | Ciurea et al. |
| 9,240,049 B2 | 1/2016 | Ciurea et al. |
| 9,253,380 B2 | 2/2016 | Venkataraman et al. |
| 9,253,397 B2 | 2/2016 | Lee et al. |
| 9,256,974 B1 | 2/2016 | Hines |
| 9,264,592 B2 | 2/2016 | Rodda et al. |
| 9,264,610 B2 | 2/2016 | Duparre |
| 9,361,662 B2 | 6/2016 | Lelescu et al. |
| 9,374,512 B2 | 6/2016 | Venkataraman et al. |
| 9,412,206 B2 | 8/2016 | McMahon et al. |
| 9,413,953 B2 | 8/2016 | Maeda |
| 9,414,048 B2 | 8/2016 | Karsch et al. |
| 9,426,343 B2 | 8/2016 | Rodda et al. |
| 9,426,361 B2 | 8/2016 | Venkataraman et al. |
| 9,438,888 B2 | 9/2016 | Venkataraman et al. |
| 9,445,003 B1 | 9/2016 | Lelescu et al. |
| 9,456,134 B2 | 9/2016 | Venkataraman et al. |
| 9,456,196 B2 | 9/2016 | Kim et al. |
| 9,462,164 B2 | 10/2016 | Venkataraman et al. |
| 9,462,184 B2 † | 10/2016 | Kauff |
| 9,485,496 B2 | 11/2016 | Venkataraman et al. |
| 9,497,370 B2 | 11/2016 | Venkataraman et al. |
| 9,497,429 B2 | 11/2016 | Mullis et al. |
| 9,516,222 B2 | 12/2016 | Duparre et al. |
| 9,519,972 B2 | 12/2016 | Venkataraman et al. |
| 9,521,319 B2 | 12/2016 | Rodda et al. |
| 9,521,416 B1 | 12/2016 | McMahon et al. |
| 9,536,166 B2 | 1/2017 | Venkataraman et al. |
| 9,576,369 B2 | 2/2017 | Venkataraman et al. |
| 9,578,237 B2 | 2/2017 | Duparre et al. |
| 9,578,259 B2 | 2/2017 | Molina |
| 9,602,805 B2 | 3/2017 | Venkataraman et al. |
| 9,633,442 B2 | 4/2017 | Venkataraman et al. |
| 9,635,274 B2 | 4/2017 | Lin et al. |
| 9,638,883 B1 | 5/2017 | Duparre |
| 9,661,310 B2 | 5/2017 | Deng et al. |
| 9,706,132 B2 | 7/2017 | Nisenzon et al. |
| 9,712,759 B2 | 7/2017 | Venkataraman et al. |
| 9,733,486 B2 | 8/2017 | Lelescu et al. |
| 9,741,118 B2 | 8/2017 | Mullis |
| 9,743,051 B2 | 8/2017 | Venkataraman et al. |
| 9,749,547 B2 | 8/2017 | Venkataraman et al. |
| 9,749,568 B2 | 8/2017 | McMahon |
| 9,754,422 B2 | 9/2017 | McMahon et al. |
| 9,766,380 B2 | 9/2017 | Duparre et al. |
| 9,769,365 B1 | 9/2017 | Jannard |
| 9,774,789 B2 | 9/2017 | Ciurea et al. |
| 9,774,831 B2 | 9/2017 | Venkataraman et al. |
| 9,787,911 B2 | 10/2017 | McMahon et al. |
| 9,794,476 B2 | 10/2017 | Nayar et al. |
| 9,800,856 B2 | 10/2017 | Venkataraman et al. |
| 9,800,859 B2 | 10/2017 | Venkataraman et al. |
| 9,807,382 B2 | 10/2017 | Duparre et al. |
| 9,811,753 B2 | 11/2017 | Venkataraman et al. |
| 9,813,616 B2 | 11/2017 | Lelescu et al. |
| 9,813,617 B2 | 11/2017 | Venkataraman et al. |
| 9,826,212 B2 | 11/2017 | Newton et al. |
| 9,858,673 B2 | 1/2018 | Ciurea et al. |
| 9,864,921 B2 | 1/2018 | Venkataraman et al. |
| 9,888,194 B2 | 2/2018 | Duparre |
| 9,898,856 B2 | 2/2018 | Yang et al. |
| 9,917,998 B2 | 3/2018 | Venkataraman et al. |
| 9,924,092 B2 | 3/2018 | Rodda et al. |
| 9,936,148 B2 | 4/2018 | McMahon |
| 9,955,070 B2 | 4/2018 | Lelescu et al. |
| 9,986,224 B2 | 5/2018 | Mullis |
| 10,009,538 B2 | 6/2018 | Venkataraman et al. |
| 10,019,816 B2 | 7/2018 | Venkataraman et al. |
| 10,027,901 B2 | 7/2018 | Venkataraman et al. |
| 10,089,740 B2 | 10/2018 | Srikanth et al. |
| 10,091,405 B2 | 10/2018 | Molina |
| 10,119,808 B2 | 11/2018 | Venkataraman et al. |
| 10,122,993 B2 | 11/2018 | Venkataraman et al. |
| 10,127,682 B2 | 11/2018 | Mullis |
| 10,142,560 B2 | 11/2018 | Venkataraman et al. |
| 10,182,216 B2 | 1/2019 | Mullis et al. |
| 10,187,560 B2 | 1/2019 | Chen et al. |
| 10,225,543 B2 | 3/2019 | Mullis |
| 10,250,871 B2 | 4/2019 | Ciurea et al. |
| 10,261,219 B2 | 4/2019 | Duparre et al. |
| 10,275,676 B2 | 4/2019 | Venkataraman et al. |
| 10,306,120 B2 | 5/2019 | Duparre |
| 10,311,649 B2 | 6/2019 | McMohan et al. |
| 10,334,241 B2 | 6/2019 | Duparre et al. |
| 10,366,472 B2 | 7/2019 | Lelescu et al. |
| 10,375,302 B2 | 8/2019 | Nayar et al. |
| 10,375,319 B2 | 8/2019 | Venkataraman et al. |
| 10,380,752 B2 | 8/2019 | Ciurea et al. |
| 10,382,665 B2 | 8/2019 | Sa et al. |
| 10,390,005 B2 | 8/2019 | Nisenzon et al. |
| 10,412,314 B2 | 9/2019 | McMahon et al. |
| 10,430,682 B2 | 10/2019 | Venkataraman et al. |
| 10,432,944 B2 | 10/2019 | Hamilton et al. |
| 10,455,168 B2 | 10/2019 | McMahon |
| 10,455,218 B2 | 10/2019 | Venkataraman et al. |
| 10,462,362 B2 | 10/2019 | Lelescu et al. |
| 10,475,163 B2 | 11/2019 | Boisson et al. |
| 10,540,806 B2 | 1/2020 | Yang et al. |
| 10,542,208 B2 | 1/2020 | Lelescu et al. |
| 10,547,772 B2 | 1/2020 | Molina |
| 10,560,684 B2 | 2/2020 | Mullis |
| 10,574,905 B2 | 2/2020 | Srikanth et al. |
| 10,638,099 B2 | 4/2020 | Mullis et al. |
| 10,674,138 B2 | 6/2020 | Venkataraman et al. |
| 10,687,068 B1 | 6/2020 | Barros Da Silva et al. |
| 10,694,114 B2 | 6/2020 | Venkataraman et al. |
| 10,708,492 B2 | 7/2020 | Venkataraman et al. |
| 10,735,635 B2 | 8/2020 | Duparre |
| 10,767,981 B2 | 9/2020 | Venkataraman et al. |
| 10,839,485 B2 | 11/2020 | Lelescu et al. |
| 10,909,707 B2 | 2/2021 | Ciurea et al. |
| 10,911,735 B2 | 2/2021 | Hamilton et al. |
| 10,944,961 B2 | 3/2021 | Ciurea et al. |
| 10,958,892 B2 | 3/2021 | Mullis |
| 10,984,276 B2 | 4/2021 | Venkataraman et al. |
| 11,022,725 B2 | 6/2021 | Duparre et al. |
| 11,064,154 B2 | 7/2021 | Cutler |
| 11,082,659 B2 | 8/2021 | Cutler |
| 11,120,260 B2 | 9/2021 | Guglielmo |
| 11,270,464 B2 | 3/2022 | Cutler |
| 11,272,161 B2 | 3/2022 | Mullis |
| 11,315,321 B2 | 4/2022 | Lucas et al. |
| 11,412,158 B2 | 8/2022 | Venkataraman et al. |
| 11,423,513 B2 | 8/2022 | Lelescu et al. |
| 11,486,698 B2 | 11/2022 | Venkataraman et al. |
| 11,503,274 B2 | 11/2022 | Smithwick |
| 11,525,906 B2 | 12/2022 | Kadambi et al. |
| 11,546,576 B2 | 1/2023 | Ciurea et al. |
| 11,553,123 B2 | 1/2023 | Cutler |
| 11,562,530 B2 | 1/2023 | Hamilton |
| 11,570,423 B2 | 1/2023 | Mullis |
| 11,729,365 B2 | 8/2023 | Venkataraman et al. |
| 11,792,538 B2 | 10/2023 | Venkataraman et al. |
| 11,875,475 B2 | 1/2024 | Lelescu et al. |
| 11,985,293 B2 | 5/2024 | Mullis |

(56) References Cited

U.S. PATENT DOCUMENTS

| | | |
|---|---|---|
| 12,002,233 B2 | 6/2024 | Ciurea et al. |
| 2001/0005225 A1 | 6/2001 | Clark et al. |
| 2001/0019621 A1 | 9/2001 | Hanna et al. |
| 2001/0028038 A1 | 10/2001 | Hamaguchi et al. |
| 2001/0038387 A1 | 11/2001 | Tomooka et al. |
| 2002/0012056 A1 | 1/2002 | Trevino et al. |
| 2002/0015536 A1 | 2/2002 | Warren et al. |
| 2002/0027608 A1 | 3/2002 | Johnson et al. |
| 2002/0028014 A1 | 3/2002 | Ono |
| 2002/0039438 A1 | 4/2002 | Mori et al. |
| 2002/0057845 A1 | 5/2002 | Fossum et al. |
| 2002/0061131 A1 | 5/2002 | Sawhney et al. |
| 2002/0063807 A1 | 5/2002 | Margulis |
| 2002/0075450 A1 | 6/2002 | Aratani et al. |
| 2002/0087403 A1 | 7/2002 | Meyers et al. |
| 2002/0089596 A1 | 7/2002 | Yasuo |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0118113 A1 | 8/2002 | Oku et al. |
| 2002/0120634 A1 | 8/2002 | Min et al. |
| 2002/0122113 A1 | 9/2002 | Foote |
| 2002/0163054 A1 | 11/2002 | Suda |
| 2002/0167537 A1 | 11/2002 | Trajkovic |
| 2002/0171666 A1 | 11/2002 | Endo et al. |
| 2002/0177054 A1 | 11/2002 | Saitoh et al. |
| 2002/0190991 A1 | 12/2002 | Efran et al. |
| 2002/0195548 A1 | 12/2002 | Dowski, Jr. et al. |
| 2003/0025227 A1 | 2/2003 | Daniell |
| 2003/0026474 A1 | 2/2003 | Yano |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0156189 A1 | 8/2003 | Utsumi et al. |
| 2003/0179418 A1 | 9/2003 | Wengender et al. |
| 2003/0188659 A1 | 10/2003 | Merry et al. |
| 2003/0190072 A1 | 10/2003 | Adkins et al. |
| 2003/0198377 A1 | 10/2003 | Ng |
| 2003/0211405 A1 | 11/2003 | Venkataraman |
| 2003/0231179 A1 | 12/2003 | Suzuki |
| 2004/0003409 A1 | 1/2004 | Berstis |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0071367 A1 | 4/2004 | Irani et al. |
| 2004/0075654 A1 | 4/2004 | Hsiao et al. |
| 2004/0096119 A1 | 5/2004 | Williams et al. |
| 2004/0100570 A1 | 5/2004 | Shizukuishi |
| 2004/0105021 A1 | 6/2004 | Hu |
| 2004/0114807 A1 | 6/2004 | Lelescu et al. |
| 2004/0141659 A1 | 7/2004 | Zhang |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179008 A1 | 9/2004 | Gordon et al. |
| 2004/0179834 A1 | 9/2004 | Szajewski et al. |
| 2004/0196379 A1 | 10/2004 | Chen et al. |
| 2004/0207600 A1 | 10/2004 | Zhang et al. |
| 2004/0207836 A1 | 10/2004 | Chhibber et al. |
| 2004/0212734 A1 | 10/2004 | Macinnis et al. |
| 2004/0213449 A1 | 10/2004 | Safaee-Rad et al. |
| 2004/0218809 A1 | 11/2004 | Blake et al. |
| 2004/0223051 A1 | 11/2004 | Peleg et al. |
| 2004/0234873 A1 | 11/2004 | Venkataraman |
| 2004/0239782 A1 | 12/2004 | Equitz et al. |
| 2004/0239885 A1 | 12/2004 | Jaynes et al. |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0007461 A1 | 1/2005 | Chou et al. |
| 2005/0009313 A1 | 1/2005 | Suzuki et al. |
| 2005/0010621 A1 | 1/2005 | Pinto et al. |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0083531 A1 | 4/2005 | Millerd et al. |
| 2005/0084179 A1 | 4/2005 | Hanna et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134698 A1 | 6/2005 | Schroeder et al. |
| 2005/0134699 A1 | 6/2005 | Nagashima |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0168924 A1 | 8/2005 | Wu et al. |
| 2005/0175257 A1 | 8/2005 | Kuroki |
| 2005/0185711 A1 | 8/2005 | Pfister et al. |
| 2005/0190972 A1 | 9/2005 | Thomas et al. |
| 2005/0205785 A1 | 9/2005 | Hornback et al. |
| 2005/0219264 A1 | 10/2005 | Shum et al. |
| 2005/0219363 A1 | 10/2005 | Kohler et al. |
| 2005/0224843 A1 | 10/2005 | Boemler |
| 2005/0225654 A1 | 10/2005 | Feldman et al. |
| 2005/0265633 A1 | 12/2005 | Piacentino et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0007331 A1 | 1/2006 | Izumi et al. |
| 2006/0013318 A1 | 1/2006 | Webb et al. |
| 2006/0018509 A1 | 1/2006 | Miyoshi |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0029271 A1 | 2/2006 | Miyoshi et al. |
| 2006/0033005 A1 | 2/2006 | Jerdev et al. |
| 2006/0034003 A1 | 2/2006 | Zalevsky |
| 2006/0034531 A1 | 2/2006 | Poon et al. |
| 2006/0035415 A1 | 2/2006 | Wood |
| 2006/0038879 A1 | 2/2006 | Kremen |
| 2006/0038891 A1 | 2/2006 | Okutomi et al. |
| 2006/0039611 A1 | 2/2006 | Rother et al. |
| 2006/0046204 A1 | 3/2006 | Ono et al. |
| 2006/0049930 A1 | 3/2006 | Zruya et al. |
| 2006/0050980 A1 | 3/2006 | Kohashi et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0103754 A1 | 5/2006 | Wenstrand et al. |
| 2006/0119597 A1 | 6/2006 | Oshino |
| 2006/0125936 A1 | 6/2006 | Gruhike et al. |
| 2006/0138322 A1 | 6/2006 | Costello et al. |
| 2006/0139475 A1 | 6/2006 | Esch et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187322 A1 | 8/2006 | Janson, Jr. et al. |
| 2006/0187338 A1 | 8/2006 | May et al. |
| 2006/0197937 A1 | 9/2006 | Bamji et al. |
| 2006/0203100 A1 | 9/2006 | Ajito et al. |
| 2006/0203113 A1 | 9/2006 | Wada et al. |
| 2006/0210146 A1 | 9/2006 | Gu |
| 2006/0210186 A1 | 9/2006 | Berkner |
| 2006/0214085 A1 | 9/2006 | Olsen et al. |
| 2006/0221250 A1 | 10/2006 | Rossbach et al. |
| 2006/0239549 A1 | 10/2006 | Kelly et al. |

(56) References Cited

U.S. PATENT DOCUMENTS

| | | |
|---|---|---|
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2006/0289772 A1 | 12/2006 | Johnson et al. |
| 2007/0002159 A1 | 1/2007 | Olsen et al. |
| 2007/0008575 A1 | 1/2007 | Yu et al. |
| 2007/0009150 A1 | 1/2007 | Suwa |
| 2007/0024614 A1 | 2/2007 | Tam et al. |
| 2007/0030356 A1 | 2/2007 | Yea et al. |
| 2007/0035707 A1 | 2/2007 | Margulis |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0116447 A1 | 5/2007 | Ye |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0140685 A1 | 6/2007 | Wu |
| 2007/0146503 A1 | 6/2007 | Shiraki |
| 2007/0146511 A1 | 6/2007 | Kinoshita et al. |
| 2007/0153335 A1 | 7/2007 | Hosaka |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0166447 A1 | 7/2007 | Ur-Rehman et al. |
| 2007/0171290 A1 | 7/2007 | Kroger |
| 2007/0177004 A1 | 8/2007 | Kolehmainen et al. |
| 2007/0182843 A1 | 8/2007 | Shimamura et al. |
| 2007/0201859 A1 | 8/2007 | Sarrat |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0225600 A1 | 9/2007 | Weibrecht et al. |
| 2007/0228256 A1 | 10/2007 | Mentzer et al. |
| 2007/0236595 A1 | 10/2007 | Pan et al. |
| 2007/0242141 A1 | 10/2007 | Ciurea |
| 2007/0247517 A1 | 10/2007 | Zhang et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0273842 A1 | 11/2007 | Morrison et al. |
| 2007/0296721 A1 | 12/2007 | Chang et al. |
| 2007/0296832 A1 | 12/2007 | Ota et al. |
| 2007/0296835 A1 | 12/2007 | Olsen et al. |
| 2007/0296847 A1 | 12/2007 | Chang et al. |
| 2007/0297696 A1 | 12/2007 | Hamza et al. |
| 2008/0006859 A1 | 1/2008 | Mionetto et al. |
| 2008/0019611 A1 | 1/2008 | Larkin et al. |
| 2008/0024683 A1 | 1/2008 | Damera-Venkata et al. |
| 2008/0025649 A1 | 1/2008 | Liu et al. |
| 2008/0029714 A1 | 2/2008 | Olsen et al. |
| 2008/0030592 A1 | 2/2008 | Border et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0056302 A1 | 3/2008 | Erdal et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0099804 A1 | 5/2008 | Venezia et al. |
| 2008/0106620 A1 | 5/2008 | Sawachi |
| 2008/0112059 A1 | 5/2008 | Choi et al. |
| 2008/0112635 A1 | 5/2008 | Kondo et al. |
| 2008/0117289 A1 | 5/2008 | Schowengerdt et al. |
| 2008/0118241 A1 | 5/2008 | TeKolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0156991 A1 | 7/2008 | Hu et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0165257 A1 | 7/2008 | Boettiger et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0208506 A1 | 8/2008 | Kuwata |
| 2008/0211737 A1 | 9/2008 | Kim et al. |
| 2008/0218610 A1 | 9/2008 | Chapman et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0278610 A1 | 11/2008 | Boettiger et al. |
| 2008/0284880 A1 | 11/2008 | Numata |
| 2008/0291295 A1 | 11/2008 | Kato et al. |
| 2008/0298674 A1 | 12/2008 | Baker et al. |
| 2008/0310501 A1 | 12/2008 | Ward et al. |
| 2009/0027543 A1 | 1/2009 | Kanehiro |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0066693 A1 | 3/2009 | Carson |
| 2009/0079862 A1 | 3/2009 | Subbotin |
| 2009/0086074 A1 | 4/2009 | Li et al. |
| 2009/0091645 A1 | 4/2009 | Trimeche et al. |
| 2009/0091806 A1 | 4/2009 | Inuiya |
| 2009/0092363 A1 | 4/2009 | Daum et al. |
| 2009/0096050 A1 | 4/2009 | Park |
| 2009/0102956 A1 | 4/2009 | Georgiev |
| 2009/0103792 A1 | 4/2009 | Rahn et al. |
| 2009/0109306 A1 | 4/2009 | Shan et al. |
| 2009/0127430 A1 | 5/2009 | Hirasawa et al. |
| 2009/0128644 A1 | 5/2009 | Camp, Jr. et al. |
| 2009/0128833 A1 | 5/2009 | Yahav |
| 2009/0129667 A1 | 5/2009 | Ho et al. |
| 2009/0140131 A1 | 6/2009 | Utagawa |
| 2009/0141933 A1 | 6/2009 | Wagg |
| 2009/0147919 A1 | 6/2009 | Goto et al. |
| 2009/0152664 A1 | 6/2009 | Klem et al. |
| 2009/0160979 A1 | 6/2009 | Xu et al. |
| 2009/0167922 A1 | 7/2009 | Perlman et al. |
| 2009/0167923 A1 | 7/2009 | Safaee-Rad et al. |
| 2009/0167934 A1 | 7/2009 | Gupta |
| 2009/0175349 A1 | 7/2009 | Ye et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0213219 A1 | 8/2009 | Eggert et al. |
| 2009/0219435 A1 | 9/2009 | Yuan |
| 2009/0225203 A1 | 9/2009 | Tanida et al. |
| 2009/0237520 A1 | 9/2009 | Kaneko et al. |
| 2009/0245573 A1 | 10/2009 | Saptharishi et al. |
| 2009/0252323 A1 | 10/2009 | Cooper |
| 2009/0256947 A1 | 10/2009 | Ciurea et al. |
| 2009/0263017 A1 | 10/2009 | Tanbakuchi |
| 2009/0268192 A1 | 10/2009 | Koenck et al. |

(56) References Cited

U.S. PATENT DOCUMENTS

| | | |
|---|---|---|
| 2009/0268970 A1 | 10/2009 | Babacan et al. |
| 2009/0268983 A1 | 10/2009 | Stone et al. |
| 2009/0273663 A1 | 11/2009 | Yoshida |
| 2009/0274387 A1 | 11/2009 | Jin |
| 2009/0279800 A1 | 11/2009 | Uetani et al. |
| 2009/0284651 A1 | 11/2009 | Srinivasan |
| 2009/0290811 A1 | 11/2009 | Imai |
| 2009/0297056 A1 | 12/2009 | Lelescu et al. |
| 2009/0302205 A9 | 12/2009 | Olsen et al. |
| 2009/0315982 A1 | 12/2009 | Schmidt et al. |
| 2009/0317061 A1 | 12/2009 | Jung et al. |
| 2009/0322876 A1 | 12/2009 | Lee et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0007714 A1 | 1/2010 | Kim et al. |
| 2010/0013927 A1 | 1/2010 | Nixon |
| 2010/0020074 A1 | 1/2010 | Taborowski et al. |
| 2010/0044815 A1 | 2/2010 | Chang |
| 2010/0045809 A1 | 2/2010 | Packard |
| 2010/0053342 A1 | 3/2010 | Hwang et al. |
| 2010/0053347 A1 | 3/2010 | Agarwala et al. |
| 2010/0053415 A1 | 3/2010 | Yun |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0074532 A1 | 3/2010 | Gordon et al. |
| 2010/0085351 A1 | 4/2010 | Deb et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103175 A1 | 4/2010 | Okutomi et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0128145 A1 | 5/2010 | Pitts et al. |
| 2010/0129048 A1 | 5/2010 | Pitts et al. |
| 2010/0133230 A1 | 6/2010 | Henriksen et al. |
| 2010/0133418 A1 | 6/2010 | Sargent et al. |
| 2010/0134667 A1 | 6/2010 | Suzuki et al. |
| 2010/0141802 A1 | 6/2010 | Knight et al. |
| 2010/0142828 A1 | 6/2010 | Chang et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0166410 A1 | 7/2010 | Chang |
| 2010/0171866 A1 | 7/2010 | Brady et al. |
| 2010/0177411 A1 | 7/2010 | Hegde et al. |
| 2010/0182406 A1 | 7/2010 | Benitez |
| 2010/0194860 A1 | 8/2010 | Mentz et al. |
| 2010/0194901 A1 | 8/2010 | van et al. |
| 2010/0195716 A1 | 8/2010 | Klein et al. |
| 2010/0201809 A1 | 8/2010 | Oyama et al. |
| 2010/0201834 A1 | 8/2010 | Maruyama et al. |
| 2010/0202054 A1 | 8/2010 | Niederer |
| 2010/0202683 A1 | 8/2010 | Robinson |
| 2010/0208100 A9 | 8/2010 | Olsen et al. |
| 2010/0214423 A1 | 8/2010 | Ogawa |
| 2010/0220212 A1 | 9/2010 | Perlman et al. |
| 2010/0223237 A1 | 9/2010 | Mishra et al. |
| 2010/0225740 A1 | 9/2010 | Jung et al. |
| 2010/0231285 A1 | 9/2010 | Boomer et al. |
| 2010/0238327 A1 | 9/2010 | Griffith et al. |
| 2010/0244165 A1 | 9/2010 | Lake et al. |
| 2010/0245684 A1 | 9/2010 | Xiao et al. |
| 2010/0254627 A1 | 10/2010 | Panahpour et al. |
| 2010/0259610 A1 | 10/2010 | Petersen et al. |
| 2010/0265346 A1 | 10/2010 | Iizuka |
| 2010/0265381 A1 | 10/2010 | Yamamoto et al. |
| 2010/0265385 A1 | 10/2010 | Knight et al. |
| 2010/0277629 A1 | 11/2010 | Tanaka |
| 2010/0281070 A1 | 11/2010 | Chan et al. |
| 2010/0289941 A1 | 11/2010 | Ito et al. |
| 2010/0290483 A1 | 11/2010 | Park et al. |
| 2010/0302423 A1 | 12/2010 | Adams, Jr. et al. |
| 2010/0309292 A1 | 12/2010 | Ho et al. |
| 2010/0309368 A1 | 12/2010 | Choi et al. |
| 2010/0321595 A1 | 12/2010 | Chiu |
| 2010/0321640 A1 | 12/2010 | Yeh et al. |
| 2010/0328456 A1 | 12/2010 | Alakarhu |
| 2010/0329556 A1 | 12/2010 | Mitarai et al. |
| 2010/0329582 A1 | 12/2010 | Albu et al. |
| 2011/0001037 A1 | 1/2011 | Tewinkle |
| 2011/0018973 A1 | 1/2011 | Takayama |
| 2011/0019048 A1 | 1/2011 | Raynor et al. |
| 2011/0019243 A1 | 1/2011 | Constant, Jr. et al. |
| 2011/0031381 A1 | 2/2011 | Tay et al. |
| 2011/0032341 A1 | 2/2011 | Ignatov et al. |
| 2011/0032370 A1 | 2/2011 | Ludwig |
| 2011/0033129 A1 | 2/2011 | Robinson |
| 2011/0038536 A1 | 2/2011 | Gong |
| 2011/0043604 A1 | 2/2011 | Peleg et al. |
| 2011/0043613 A1 | 2/2011 | Rohaly et al. |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0051255 A1 | 3/2011 | Lee et al. |
| 2011/0055729 A1 | 3/2011 | Mason et al. |
| 2011/0064327 A1 | 3/2011 | Dagher et al. |
| 2011/0069189 A1 | 3/2011 | Venkataraman et al. |
| 2011/0080487 A1 | 4/2011 | Venkataraman et al. |
| 2011/0085028 A1 | 4/2011 | Samadani et al. |
| 2011/0090217 A1 | 4/2011 | Mashitani et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128393 A1 | 6/2011 | Tavi et al. |
| 2011/0128412 A1 | 6/2011 | Milnes et al. |
| 2011/0129165 A1 | 6/2011 | Lim et al. |
| 2011/0141309 A1 | 6/2011 | Nagashima et al. |
| 2011/0142138 A1 | 6/2011 | Tian et al. |
| 2011/0149408 A1 | 6/2011 | Hahgholt et al. |
| 2011/0149409 A1 | 6/2011 | Haugholt et al. |
| 2011/0150321 A1 | 6/2011 | Cheong et al. |
| 2011/0153248 A1 | 6/2011 | Gu et al. |
| 2011/0157321 A1 | 6/2011 | Nakajima et al. |
| 2011/0157451 A1 | 6/2011 | Chang |
| 2011/0169818 A1 | 7/2011 | Pan et al. |
| 2011/0169921 A1 | 7/2011 | Lee et al. |
| 2011/0169994 A1 | 7/2011 | DiFrancesco et al. |
| 2011/0176020 A1 | 7/2011 | Chang |
| 2011/0181797 A1 | 7/2011 | Galstian et al. |
| 2011/0193944 A1 | 8/2011 | Lian et al. |
| 2011/0199458 A1 | 8/2011 | Hayasaka et al. |
| 2011/0200319 A1 | 8/2011 | Kravitz et al. |
| 2011/0206291 A1 | 8/2011 | Kashani et al. |
| 2011/0207074 A1 | 8/2011 | Hall-Holt et al. |
| 2011/0211068 A1 | 9/2011 | Yokota |
| 2011/0211077 A1 | 9/2011 | Nayar et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0221950 A1 | 9/2011 | Oostra et al. |
| 2011/0222757 A1 | 9/2011 | Yeatman, Jr. et al. |
| 2011/0228142 A1 | 9/2011 | Brueckner et al. |
| 2011/0228144 A1 | 9/2011 | Tian et al. |
| 2011/0234825 A1 | 9/2011 | Liu et al. |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0243428 A1 | 10/2011 | Das et al. |
| 2011/0255592 A1 | 10/2011 | Sung et al. |
| 2011/0255745 A1 | 10/2011 | Hodder et al. |
| 2011/0261993 A1 | 10/2011 | Weiming et al. |

(56) References Cited

U.S. PATENT DOCUMENTS

| | | |
|---|---|---|
| 2011/0267264 A1 | 11/2011 | Mccarthy et al. |
| 2011/0267348 A1 | 11/2011 | Lin et al. |
| 2011/0267531 A1 | 11/2011 | Imai |
| 2011/0273531 A1 | 11/2011 | Ito et al. |
| 2011/0274175 A1 | 11/2011 | Sumitomo |
| 2011/0274366 A1 | 11/2011 | Tardif |
| 2011/0279705 A1 | 11/2011 | Kuang et al. |
| 2011/0279721 A1 | 11/2011 | McMahon |
| 2011/0285701 A1 | 11/2011 | Chen et al. |
| 2011/0285866 A1 | 11/2011 | Bhrugumalla et al. |
| 2011/0285910 A1 | 11/2011 | Bamji et al. |
| 2011/0292216 A1 | 12/2011 | Fergus et al. |
| 2011/0298898 A1 | 12/2011 | Jung et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0316968 A1 | 12/2011 | Taguchi et al. |
| 2011/0317766 A1 | 12/2011 | Lim et al. |
| 2012/0012748 A1 | 1/2012 | Pain et al. |
| 2012/0013748 A1 | 1/2012 | Stanwood et al. |
| 2012/0014456 A1 | 1/2012 | Martinez et al. |
| 2012/0019530 A1 | 1/2012 | Baker |
| 2012/0019700 A1 | 1/2012 | Gaber |
| 2012/0023456 A1 | 1/2012 | Sun et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0026451 A1 | 2/2012 | Nystrom |
| 2012/0026478 A1 | 2/2012 | Chen et al. |
| 2012/0038745 A1 | 2/2012 | Yu et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0051624 A1 | 3/2012 | Ando |
| 2012/0056982 A1 | 3/2012 | Katz et al. |
| 2012/0057040 A1 | 3/2012 | Park et al. |
| 2012/0062548 A1 | 3/2012 | Pan et al. |
| 2012/0062697 A1 | 3/2012 | Treado et al. |
| 2012/0062702 A1 | 3/2012 | Jiang et al. |
| 2012/0062756 A1 | 3/2012 | Tian et al. |
| 2012/0069235 A1 | 3/2012 | Imai |
| 2012/0081519 A1 | 4/2012 | Goma et al. |
| 2012/0086803 A1 | 4/2012 | Malzbender et al. |
| 2012/0105590 A1 | 5/2012 | Fukumoto et al. |
| 2012/0105654 A1 | 5/2012 | Kwatra et al. |
| 2012/0105691 A1 | 5/2012 | Waqas et al. |
| 2012/0113232 A1 | 5/2012 | Joblove |
| 2012/0113318 A1 | 5/2012 | Galstian et al. |
| 2012/0113413 A1 | 5/2012 | Miahczylowicz-Wolski et al. |
| 2012/0114224 A1 | 5/2012 | Xu et al. |
| 2012/0120264 A1 | 5/2012 | Lee et al. |
| 2012/0127155 A1 | 5/2012 | Deshpande |
| 2012/0127275 A1 | 5/2012 | Von et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154530 A1 | 6/2012 | Yamada |
| 2012/0154551 A1 | 6/2012 | Inoue |
| 2012/0155830 A1 | 6/2012 | Sasaki et al. |
| 2012/0163672 A1 | 6/2012 | McKinnon |
| 2012/0163725 A1 | 6/2012 | Fukuhara |
| 2012/0169433 A1 | 7/2012 | Mullins et al. |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188235 A1 | 7/2012 | Wu et al. |
| 2012/0188341 A1 | 7/2012 | Klein et al. |
| 2012/0188389 A1 | 7/2012 | Lin et al. |
| 2012/0188420 A1 | 7/2012 | Black et al. |
| 2012/0188634 A1 | 7/2012 | Kubala et al. |
| 2012/0196679 A1 | 8/2012 | Newcombe et al. |
| 2012/0198677 A1 | 8/2012 | Duparre |
| 2012/0200669 A1 | 8/2012 | Lai et al. |
| 2012/0200726 A1 | 8/2012 | Bugnariu |
| 2012/0200734 A1 | 8/2012 | Tang |
| 2012/0206582 A1 | 8/2012 | DiCarlo et al. |
| 2012/0219236 A1 | 8/2012 | Ali et al. |
| 2012/0224083 A1 | 9/2012 | Jovanovski et al. |
| 2012/0229602 A1 | 9/2012 | Chen et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0249836 A1 | 10/2012 | Ali et al. |
| 2012/0249853 A1 | 10/2012 | Krolczyk et al. |
| 2012/0250990 A1 | 10/2012 | Bocirnea |
| 2012/0262601 A1 | 10/2012 | Choi et al. |
| 2012/0262607 A1 | 10/2012 | Shimura et al. |
| 2012/0268574 A1 | 10/2012 | Gidon et al. |
| 2012/0274626 A1 | 11/2012 | Hsieh |
| 2012/0287291 A1 | 11/2012 | McMahon |
| 2012/0290257 A1 | 11/2012 | Hodge et al. |
| 2012/0293489 A1 | 11/2012 | Chen et al. |
| 2012/0293624 A1 | 11/2012 | Chen et al. |
| 2012/0293695 A1 | 11/2012 | Tanaka |
| 2012/0294510 A1 | 11/2012 | Zhang et al. |
| 2012/0307023 A1 | 12/2012 | Freiburg et al. |
| 2012/0307093 A1 | 12/2012 | Miyoshi |
| 2012/0307099 A1 | 12/2012 | Yahata |
| 2012/0314033 A1 | 12/2012 | Lee et al. |
| 2012/0314937 A1 | 12/2012 | Kim et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do et al. |
| 2013/0016245 A1 | 1/2013 | Yuba |
| 2013/0016885 A1 | 1/2013 | Tsujimoto |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0038696 A1 | 2/2013 | Ding et al. |
| 2013/0047396 A1 | 2/2013 | Au et al. |
| 2013/0050504 A1 | 2/2013 | Safaee-Rad et al. |
| 2013/0050526 A1 | 2/2013 | Keelan |
| 2013/0057710 A1 | 3/2013 | McMahon |
| 2013/0070060 A1 | 3/2013 | Chatterjee et al. |
| 2013/0076967 A1 | 3/2013 | Brunner et al. |
| 2013/0077859 A1 | 3/2013 | Stauder et al. |
| 2013/0077880 A1 | 3/2013 | Venkataraman et al. |
| 2013/0077882 A1 | 3/2013 | Venkataraman et al. |
| 2013/0083172 A1 | 4/2013 | Baba |
| 2013/0088489 A1 | 4/2013 | Schmeitz et al. |
| 2013/0088637 A1 | 4/2013 | Duparre |
| 2013/0093842 A1 | 4/2013 | Yahata |
| 2013/0100254 A1 | 4/2013 | Morioka et al. |
| 2013/0107061 A1 | 5/2013 | Kumar et al. |
| 2013/0113888 A1 | 5/2013 | Koguchi |
| 2013/0113899 A1 | 5/2013 | Morohoshi et al. |
| 2013/0113939 A1 | 5/2013 | Strandemar |
| 2013/0120536 A1 | 5/2013 | Song et al. |
| 2013/0120605 A1 | 5/2013 | Georgiev et al. |
| 2013/0121559 A1 | 5/2013 | Hu et al. |
| 2013/0127988 A1 | 5/2013 | Wang et al. |
| 2013/0128068 A1 | 5/2013 | Georgiev et al. |
| 2013/0128069 A1 | 5/2013 | Georgiev et al. |
| 2013/0128087 A1 | 5/2013 | Georgiev et al. |
| 2013/0128121 A1 | 5/2013 | Agarwala et al. |
| 2013/0135315 A1 | 5/2013 | Bares et al. |
| 2013/0135448 A1 | 5/2013 | Nagumo et al. |
| 2013/0147979 A1 | 6/2013 | McMahon et al. |
| 2013/0155050 A1 | 6/2013 | Rastogi et al. |
| 2013/0162641 A1 | 6/2013 | Zhang et al. |
| 2013/0169754 A1 | 7/2013 | Aronsson et al. |
| 2013/0176394 A1 | 7/2013 | Tian et al. |
| 2013/0208138 A1 | 8/2013 | Li et al. |
| 2013/0215108 A1 | 8/2013 | McMahon et al. |
| 2013/0215231 A1 | 8/2013 | Hiramoto et al. |
| 2013/0222556 A1 | 8/2013 | Shimada |
| 2013/0222656 A1 | 8/2013 | Kaneko |
| 2013/0223759 A1 | 8/2013 | Nishiyama |
| 2013/0229540 A1 | 9/2013 | Farina et al. |
| 2013/0230237 A1 | 9/2013 | Schlosser et al. |
| 2013/0250123 A1 | 9/2013 | Zhang et al. |

(56) References Cited

U.S. PATENT DOCUMENTS

| | | |
|---|---|---|
| 2013/0250150 A1 | 9/2013 | Malone et al. |
| 2013/0258067 A1 | 10/2013 | Zhang et al. |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2013/0274923 A1 | 10/2013 | By |
| 2013/0286236 A1 | 10/2013 | Mankowski |
| 2013/0293760 A1 | 11/2013 | Nisenzon et al. |
| 2013/0308197 A1 | 11/2013 | Duparre |
| 2013/0321581 A1 | 12/2013 | El-ghoroury et al. |
| 2013/0321589 A1 | 12/2013 | Kirk et al. |
| 2013/0329015 A1 | 12/2013 | Pulli et al. |
| 2013/0335598 A1 | 12/2013 | Gustavsson et al. |
| 2013/0342641 A1 | 12/2013 | Morioka et al. |
| 2014/0002610 A1 | 1/2014 | Xi et al. |
| 2014/0002674 A1 | 1/2014 | Duparre et al. |
| 2014/0002675 A1 | 1/2014 | Duparre et al. |
| 2014/0009586 A1 | 1/2014 | McNamer et al. |
| 2014/0013273 A1 | 1/2014 | Ng |
| 2014/0014818 A1 | 1/2014 | Cho et al. |
| 2014/0037137 A1 | 2/2014 | Broaddus et al. |
| 2014/0037140 A1 | 2/2014 | Benhimane et al. |
| 2014/0043507 A1 | 2/2014 | Wang et al. |
| 2014/0059462 A1 | 2/2014 | Wernersson |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0081454 A1 | 3/2014 | Nuyujukian et al. |
| 2014/0085502 A1 | 3/2014 | Lin et al. |
| 2014/0092281 A1 | 4/2014 | Nisenzon et al. |
| 2014/0098266 A1 | 4/2014 | Nayar et al. |
| 2014/0098267 A1 | 4/2014 | Tian et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0125771 A1 | 5/2014 | Grossmann et al. |
| 2014/0132734 A1 | 5/2014 | Zhuang et al. |
| 2014/0132810 A1 | 5/2014 | McMahon |
| 2014/0139642 A1 | 5/2014 | Ni et al. |
| 2014/0139643 A1 | 5/2014 | Hogasten et al. |
| 2014/0140626 A1 | 5/2014 | Cho et al. |
| 2014/0146132 A1 | 5/2014 | Bagnato et al. |
| 2014/0146139 A1 | 5/2014 | Schwartz et al. |
| 2014/0146201 A1 | 5/2014 | Knight et al. |
| 2014/0168424 A1 | 6/2014 | Attar et al. |
| 2014/0176592 A1 | 6/2014 | Wilburn et al. |
| 2014/0183334 A1 | 7/2014 | Wang et al. |
| 2014/0186045 A1 | 7/2014 | Poddar et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0204183 A1 | 7/2014 | Lee et al. |
| 2014/0218546 A1 | 8/2014 | McMahon |
| 2014/0219549 A1 | 8/2014 | Choi et al. |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267633 A1 | 9/2014 | Venkataraman et al. |
| 2014/0267762 A1 | 9/2014 | Mullis et al. |
| 2014/0267829 A1 | 9/2014 | McMahon et al. |
| 2014/0267890 A1 | 9/2014 | Lelescu et al. |
| 2014/0285675 A1 | 9/2014 | Mullis |
| 2014/0300706 A1 | 10/2014 | Song |
| 2014/0313315 A1 | 10/2014 | Shoham et al. |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0347748 A1 | 11/2014 | Duparre |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0035992 A1 | 2/2015 | Mullis |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085073 A1 | 3/2015 | Bruls et al. |
| 2015/0085174 A1 | 3/2015 | Shabtay et al. |
| 2015/0091900 A1 | 4/2015 | Yang et al. |
| 2015/0098079 A1 | 4/2015 | Montgomery et al. |
| 2015/0104076 A1 | 4/2015 | Hayasaka |
| 2015/0104101 A1 | 4/2015 | Bryant et al. |
| 2015/0122411 A1 | 5/2015 | Rodda et al. |
| 2015/0124059 A1 | 5/2015 | Georgiev et al. |
| 2015/0124113 A1 | 5/2015 | Rodda et al. |
| 2015/0124151 A1 | 5/2015 | Rodda et al. |
| 2015/0138346 A1 | 5/2015 | Venkataraman et al. |
| 2015/0146029 A1 | 5/2015 | Venkataraman et al. |
| 2015/0146030 A1 | 5/2015 | Venkataraman et al. |
| 2015/0161798 A1 | 6/2015 | Venkataraman et al. |
| 2015/0199793 A1 | 7/2015 | Venkataraman et al. |
| 2015/0199841 A1 | 7/2015 | Venkataraman et al. |
| 2015/0229911 A1 | 8/2015 | Ge et al. |
| 2015/0235476 A1 | 8/2015 | McMahon et al. |
| 2015/0237329 A1 | 8/2015 | Venkataraman et al. |
| 2015/0243480 A1 | 8/2015 | Yamada |
| 2015/0244927 A1 | 8/2015 | Laroia et al. |
| 2015/0245013 A1 | 8/2015 | Venkataraman et al. |
| 2015/0248744 A1 | 9/2015 | Hayasaka et al. |
| 2015/0254868 A1 | 9/2015 | Srikanth et al. |
| 2015/0264337 A1 | 9/2015 | Venkataraman et al. |
| 2015/0296137 A1 | 10/2015 | Duparre et al. |
| 2015/0312455 A1 | 10/2015 | Venkataraman et al. |
| 2015/0326852 A1 | 11/2015 | Duparre et al. |
| 2015/0332468 A1 | 11/2015 | Hayasaka et al. |
| 2015/0373261 A1 | 12/2015 | Rodda et al. |
| 2015/0381972 A1 | 12/2015 | Kowdle et al. |
| 2016/0037097 A1 | 2/2016 | Duparre |
| 2016/0044252 A1 | 2/2016 | Molina |
| 2016/0044257 A1 | 2/2016 | Venkataraman et al. |
| 2016/0057332 A1 | 2/2016 | Ciurea et al. |
| 2016/0065934 A1 | 3/2016 | Kaza et al. |
| 2016/0163051 A1 | 6/2016 | Mullis |
| 2016/0165106 A1 | 6/2016 | Duparre |
| 2016/0165134 A1 | 6/2016 | Lelescu et al. |
| 2016/0165147 A1 | 6/2016 | Nisenzon et al. |
| 2016/0165212 A1 | 6/2016 | Mullis |
| 2016/0191768 A1 | 6/2016 | Shin et al. |
| 2016/0195733 A1 | 7/2016 | Lelescu et al. |
| 2016/0198096 A1 | 7/2016 | McMahon et al. |
| 2016/0227195 A1 | 8/2016 | Venkataraman et al. |
| 2016/0249001 A1 | 8/2016 | McMahon |
| 2016/0255333 A1 | 9/2016 | Nisenzon et al. |

(56) References Cited

U.S. PATENT DOCUMENTS

| | | |
|---|---|---|
| 2016/0266284 A1 | 9/2016 | Duparre et al. |
| 2016/0267665 A1 | 9/2016 | Venkataraman et al. |
| 2016/0267672 A1 | 9/2016 | Ciurea et al. |
| 2016/0269626 A1 | 9/2016 | McMahon |
| 2016/0269627 A1 | 9/2016 | McMahon |
| 2016/0269650 A1 | 9/2016 | Venkataraman et al. |
| 2016/0269651 A1 | 9/2016 | Venkataraman et al. |
| 2016/0269664 A1 | 9/2016 | Duparre |
| 2016/0316140 A1 | 10/2016 | Nayar et al. |
| 2017/0006233 A1 | 1/2017 | Venkataraman et al. |
| 2017/0048468 A1 | 2/2017 | Pain et al. |
| 2017/0053382 A1 | 2/2017 | Lelescu et al. |
| 2017/0054901 A1 | 2/2017 | Venkataraman et al. |
| 2017/0070672 A1 | 3/2017 | Rodda et al. |
| 2017/0070673 A1 | 3/2017 | Lelescu et al. |
| 2017/0078568 A1 | 3/2017 | Venkataraman et al. |
| 2017/0085845 A1 | 3/2017 | Venkataraman et al. |
| 2017/0094243 A1 | 3/2017 | Venkataraman et al. |
| 2017/0099465 A1 | 4/2017 | Mullis et al. |
| 2017/0163862 A1 | 6/2017 | Molina |
| 2017/0178363 A1 | 6/2017 | Venkataraman et al. |
| 2017/0187933 A1 | 6/2017 | Duparre |
| 2017/0188011 A1 | 6/2017 | Panescu et al. |
| 2017/0244960 A1 | 8/2017 | Ciurea et al. |
| 2017/0257562 A1 | 9/2017 | Venkataraman et al. |
| 2017/0365104 A1 | 12/2017 | McMahon et al. |
| 2018/0007284 A1 | 1/2018 | Venkataraman et al. |
| 2018/0013945 A1 | 1/2018 | Ciurea et al. |
| 2018/0024330 A1 | 1/2018 | Laroia |
| 2018/0035057 A1 | 2/2018 | McMahon et al. |
| 2018/0040135 A1 | 2/2018 | Mullis |
| 2018/0048830 A1 | 2/2018 | Venkataraman et al. |
| 2018/0048879 A1 | 2/2018 | Venkataraman et al. |
| 2018/0081090 A1 | 3/2018 | Duparre et al. |
| 2018/0097993 A1 | 4/2018 | Nayar et al. |
| 2018/0109782 A1 | 4/2018 | Duparre et al. |
| 2018/0124311 A1 | 5/2018 | Lelescu et al. |
| 2018/0139382 A1 | 5/2018 | Venkataraman et al. |
| 2018/0197035 A1 | 7/2018 | Venkataraman et al. |
| 2018/0211402 A1 | 7/2018 | Ciurea et al. |
| 2018/0227511 A1 | 8/2018 | McMahon |
| 2018/0240265 A1 | 8/2018 | Yang et al. |
| 2018/0270473 A1 | 9/2018 | Mullis |
| 2018/0302554 A1 | 10/2018 | Lelescu et al. |
| 2018/0330182 A1 | 11/2018 | Venkataraman et al. |
| 2018/0336704 A1 | 11/2018 | Javan Roshtkhari et al. |
| 2019/0037116 A1 | 1/2019 | Molina |
| 2019/0037150 A1 | 1/2019 | Srikanth et al. |
| 2019/0043253 A1 | 2/2019 | Lucas et al. |
| 2019/0063905 A1 | 2/2019 | Venkataraman et al. |
| 2019/0089947 A1 | 3/2019 | Venkataraman et al. |
| 2019/0098209 A1 | 3/2019 | Venkataraman et al. |
| 2019/0109998 A1 | 4/2019 | Venkataraman et al. |
| 2019/0215496 A1 | 7/2019 | Mullis et al. |
| 2019/0230348 A1 | 7/2019 | Ciurea et al. |
| 2019/0235138 A1 | 8/2019 | Duparre et al. |
| 2019/0268586 A1 | 8/2019 | Mullis |
| 2019/0289176 A1 | 9/2019 | Duparre |
| 2019/0347768 A1 | 11/2019 | Lelescu et al. |
| 2019/0356863 A1 | 11/2019 | Venkataraman et al. |
| 2019/0356908 A1 | 11/2019 | Flagg et al. |
| 2019/0362515 A1 | 11/2019 | Ciurea et al. |
| 2019/0364263 A1 | 11/2019 | Jannard et al. |
| 2020/0026948 A1 | 1/2020 | Venkataraman et al. |
| 2020/0252597 A1 | 8/2020 | Mullis |
| 2020/0389604 A1 | 12/2020 | Venkataraman et al. |
| 2021/0063141 A1 | 3/2021 | Venkataraman et al. |
| 2021/0133927 A1 | 5/2021 | Lelescu et al. |
| 2021/0150748 A1 | 5/2021 | Ciurea et al. |
| 2021/0281816 A1 | 9/2021 | Mullis |
| 2021/0281828 A1 | 9/2021 | Ciurea et al. |
| 2021/0312207 A1 | 10/2021 | Venkataraman et al. |
| 2022/0239890 A1 | 7/2022 | Mullis |
| 2022/0385848 A1 | 12/2022 | Venkataraman et al. |
| 2022/0414829 A1 | 12/2022 | Lelescu et al. |
| 2023/0152087 A1 | 5/2023 | Venkataraman et al. |
| 2023/0336707 A1 | 10/2023 | Ciurea et al. |
| 2023/0362344 A1 | 11/2023 | Mullis |
| 2023/0421742 A1 | 12/2023 | Venkataraman et al. |
| 2024/0031690 A1 | 1/2024 | Venkataraman et al. |
| 2024/0040270 A1 | 2/2024 | Venkataraman et al. |
| 2024/0331181 A1 | 10/2024 | Ciurea et al. |

FOREIGN PATENT DOCUMENTS

| | | |
|---|---|---|
| CN | 1839394 A | 9/2006 |
| CN | 1985524 A | 6/2007 |
| CN | 101010619 A | 8/2007 |
| CN | 101046882 A | 10/2007 |
| CN | 101064780 A | 10/2007 |
| CN | 101102388 A | 1/2008 |
| CN | 101147392 A | 3/2008 |
| CN | 201043890 Y | 4/2008 |
| CN | 101212566 A | 7/2008 |
| CN | 101312540 A | 11/2008 |
| CN | 101427372 A | 5/2009 |
| CN | 101593350 A | 12/2009 |
| CN | 101606086 A | 12/2009 |
| CN | 101627280 A | 1/2010 |
| CN | 101883291 A | 11/2010 |
| CN | 102037717 A | 4/2011 |
| CN | 102184720 A | 9/2011 |
| CN | 102375199 A | 3/2012 |
| CN | 103004180 A | 3/2013 |
| CN | 104081414 A | 10/2014 |
| CN | 104508681 A | 4/2015 |
| CN | 104662589 A | 5/2015 |
| CN | 104685513 A | 6/2015 |
| CN | 104685860 A | 6/2015 |
| CN | 104081414 B | 8/2017 |
| CN | 104662589 B | 8/2017 |
| CN | 107077743 A | 8/2017 |
| CN | 107230236 A | 10/2017 |
| CN | 107346061 A | 11/2017 |
| CN | 104685513 B | 4/2018 |
| CN | 104335246 B | 9/2018 |
| CN | 107346061 B | 4/2020 |
| CN | 107230236 B | 12/2020 |
| CN | 107077743 B | 3/2021 |
| CN | 113256730 A | 8/2021 |
| CN | 113256730 B | 9/2023 |
| DE | 602011041799.1 | 9/2017 |
| EP | 0677821 A2 | 10/1995 |
| EP | 0840502 A2 | 5/1998 |
| EP | 1201407 A2 | 5/2002 |
| EP | 1355274 A2 | 10/2003 |
| EP | 1418766 A2 | 5/2004 |
| EP | 1734766 A2 | 12/2006 |
| EP | 1243945 B1 | 1/2009 |
| EP | 2026563 A1 | 2/2009 |
| EP | 2104334 A1 | 9/2009 |
| EP | 2244484 A1 | 10/2010 |
| EP | 0957642 B1 | 4/2011 |
| EP | 2336816 A2 | 6/2011 |
| EP | 2339532 A1 | 6/2011 |
| EP | 2381418 A1 | 10/2011 |
| EP | 2502115 A2 | 9/2012 |
| EP | 2569935 A1 | 3/2013 |
| EP | 2652678 A1 | 10/2013 |
| EP | 2761534 A1 | 8/2014 |
| EP | 2777245 A1 | 9/2014 |
| EP | 2867718 A1 | 5/2015 |
| EP | 2873028 A1 | 5/2015 |
| EP | 2888698 A2 | 7/2015 |
| EP | 2888720 A1 | 7/2015 |
| EP | 2901671 A2 | 8/2015 |
| EP | 2973476 A1 | 1/2016 |
| EP | 3066690 A1 | 9/2016 |
| EP | 2569935 B1 | 12/2016 |
| EP | 3201877 A1 | 8/2017 |
| EP | 2652678 B1 | 9/2017 |
| EP | 3201877 A4 | 3/2018 |
| EP | 2817955 B1 | 4/2018 |
| EP | 3328048 A1 | 5/2018 |

(56) References Cited

FOREIGN PATENT DOCUMENTS

| | | |
|---|---|---|
| EP | 3075140 B1 | 6/2018 |
| EP | 3201877 B1 | 12/2018 |
| EP | 3467776 A1 | 4/2019 |
| EP | 2761534 B1 | 11/2020 |
| EP | 2888720 B1 | 3/2021 |
| EP | 3328048 B1 | 4/2021 |
| EP | 3869797 A1 | 8/2021 |
| EP | 3876510 A1 | 9/2021 |
| EP | 3869797 B1 | 7/2023 |
| EP | 4296963 A2 | 12/2023 |
| EP | 4307659 A1 | 1/2024 |
| EP | 4336447 A1 | 3/2024 |
| GB | 2482022 A | 1/2012 |
| IN | 2708CHEN2014 A1 | 8/2015 |
| IN | 361194 B | 3/2021 |
| JP | 59025483 A | 2/1984 |
| JP | 64037177 A | 2/1989 |
| JP | 02285772 A | 11/1990 |
| JP | 06129851 A | 5/1994 |
| JP | 07015457 A | 1/1995 |
| JP | H0756112 A | 3/1995 |
| JP | 09171075 A | 6/1997 |
| JP | 09181913 A | 7/1997 |
| JP | 10253351 A | 9/1998 |
| JP | 11142609 A | 5/1999 |
| JP | 11223708 A | 8/1999 |
| JP | 11325889 A | 11/1999 |
| JP | 2000209503 A | 7/2000 |
| JP | 2001008235 A2 | 1/2001 |
| JP | 2001194114 A2 | 7/2001 |
| JP | 2001264033 A2 | 9/2001 |
| JP | 2001277260 A | 10/2001 |
| JP | 2001337263 A2 | 12/2001 |
| JP | 2002195910 A | 7/2002 |
| JP | 2002205310 A | 7/2002 |
| JP | 2002209226 A | 7/2002 |
| JP | 2002250607 A | 9/2002 |
| JP | 2002252338 A | 9/2002 |
| JP | 2003094445 A | 4/2003 |
| JP | 2003139910 A | 5/2003 |
| JP | 2003163938 A | 6/2003 |
| JP | 2003298920 A | 10/2003 |
| JP | 2004221585 A | 8/2004 |
| JP | 2005116022 A | 4/2005 |
| JP | 2005181460 A | 7/2005 |
| JP | 2005295381 A | 10/2005 |
| JP | 2005303694 A | 10/2005 |
| JP | 2005341569 A | 12/2005 |
| JP | 2005354124 A | 12/2005 |
| JP | 2006033228 A | 2/2006 |
| JP | 2006033493 A | 2/2006 |
| JP | 2006047944 A | 2/2006 |
| JP | 2006258930 A | 9/2006 |
| JP | 2007520107 A | 7/2007 |
| JP | 2007259136 A | 10/2007 |
| JP | 2008039852 A | 2/2008 |
| JP | 2008055908 A | 3/2008 |
| JP | 2008507874 A | 3/2008 |
| JP | 2008172735 A | 7/2008 |
| JP | 2008258885 A | 10/2008 |
| JP | 2009064421 A | 3/2009 |
| JP | 2009132010 A | 6/2009 |
| JP | 2009300268 A | 12/2009 |
| JP | 2010139288 A | 6/2010 |
| JP | 2011017764 A | 1/2011 |
| JP | 2011030184 A | 2/2011 |
| JP | 2011109484 A | 6/2011 |
| JP | 2011523538 A | 8/2011 |
| JP | 2011203238 A | 10/2011 |
| JP | 2012504805 A | 2/2012 |
| JP | 2011052064 A1 | 3/2013 |
| JP | 2013509022 A | 3/2013 |
| JP | 2013526801 A | 6/2013 |
| JP | 2014521117 A | 8/2014 |
| JP | 2014535191 A | 12/2014 |
| JP | 2015522178 A | 8/2015 |
| JP | 2015534734 A | 12/2015 |
| JP | 5848754 B2 | 1/2016 |
| JP | 2016524125 A | 8/2016 |
| JP | 6140709 B2 | 5/2017 |
| JP | 2017163550 A | 9/2017 |
| JP | 2017163587 A | 9/2017 |
| JP | 2017531976 A | 10/2017 |
| JP | 6546613 B2 | 7/2019 |
| JP | 6630891 B2 | 12/2019 |
| JP | 2019220957 A | 12/2019 |
| JP | 2020017999 A | 1/2020 |
| JP | 6767543 B2 | 9/2020 |
| JP | 6767558 B2 | 9/2020 |
| KR | 1020110097647 A | 8/2011 |
| KR | 20170063827 A | 6/2017 |
| KR | 101824672 B1 | 2/2018 |
| KR | 101843994 B1 | 3/2018 |
| KR | 102002165 B1 | 7/2019 |
| KR | 102111181 B1 | 5/2020 |
| SG | 191151 A1 | 7/2013 |
| SG | 11201500910 R | 10/2015 |
| TW | 200828994 A | 7/2008 |
| TW | 200939739 A | 9/2009 |
| TW | 201228382 A | 7/2012 |
| TW | I535292 B | 5/2016 |
| WO | 1994020875 A3 | 9/1994 |
| WO | 2005057922 A1 | 6/2005 |
| WO | 2006039906 A2 | 4/2006 |
| WO | 2006039906 A3 | 4/2006 |
| WO | 2007013250 A1 | 2/2007 |
| WO | 2007052191 A2 | 5/2007 |
| WO | 2007083579 A1 | 7/2007 |
| WO | 2007134137 A2 | 11/2007 |
| WO | 2008045198 A2 | 4/2008 |
| WO | 2008050904 A1 | 5/2008 |
| WO | 2008108271 A1 | 9/2008 |
| WO | 2008108926 A1 | 9/2008 |
| WO | 2008150817 A1 | 12/2008 |
| WO | 2009073950 A1 | 6/2009 |
| WO | 2009151903 A2 | 12/2009 |
| WO | 2009157273 A1 | 12/2009 |
| WO | 2010037512 A1 | 4/2010 |
| WO | 2011008443 A2 | 1/2011 |
| WO | 2011026527 A1 | 3/2011 |
| WO | 2011046607 A2 | 4/2011 |
| WO | 2011055655 A1 | 5/2011 |
| WO | 2011063347 A2 | 5/2011 |
| WO | 2011105814 A2 | 9/2011 |
| WO | 2011116203 A1 | 9/2011 |
| WO | 2011063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013068759 A1 | 5/2013 |
| WO | 2013119706 A1 | 8/2013 |
| WO | 2013126578 A1 | 8/2013 |
| WO | 2013166215 A1 | 11/2013 |
| WO | 2014004134 A1 | 1/2014 |
| WO | 2014005123 A1 | 1/2014 |
| WO | 2014031795 A1 | 2/2014 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |

(56) References Cited

FOREIGN PATENT DOCUMENTS

| WO | 2014138695 A1 | 9/2014 |
|---|---|---|
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014149902 A1 | 9/2014 |
| WO | 2014150856 A1 | 9/2014 |
| WO | 2014153098 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |
| WO | 2014133974 A9 | 4/2015 |
| WO | 2015048694 A2 | 4/2015 |
| WO | 2015070105 A1 | 5/2015 |
| WO | 2015074078 A1 | 5/2015 |
| WO | 2015081279 A1 | 6/2015 |
| WO | 2015134996 A1 | 9/2015 |
| WO | 2015183824 A1 | 12/2015 |
| WO | 2016054089 A1 | 4/2016 |

OTHER PUBLICATIONS

Extended European Search Report for European Application No. 23185907.5, Search completed Feb. 12, 2024, Mailed Feb. 23, 2024, 09Pgs.
Extended European Search Report for European Application No. 23206157.2, Search completed Jan. 26, 2024, Mailed Feb. 12, 2024 10 Pgs.
"Light Field—Wikipedia, the Free Encyclopedia", The Wayback Machine—Aug. 15, 2012, https://web.archive.Org/web/20120815204221/http://en.wikipedia.org/wiki/Light_field, XP093106694, Retrieved from the Internet :, RL:https://web.archive.org/web/20120815204221/https://en.Wikipedia.org/wiki/Light_field#Ways-to_create-light-fields [retrieved on Nov. 28, 2023].
Debevec et al., "Modeling and Rendering Architecture from Photographs: a Hybrid Geometry- and Image-Based Approach", Computer Graphics Proceedings. Siggraph '96, Jan. 19, 1996, pp. 11-20, XP093106889, New York, US DOI: 10.1145/237170.237191 ISBN: 978-0-89791-746-9 Retrieved from the Internet:, URL:https ://www2.eecs.berkeley.edu/Pubs/TechRpts/1996/CSD-96-893.pdf> [retrieved on Nov. 28, 2023].
Hasinoff et al., "Burst photography for high dynamic range and low-light imaging on mobile cameras", ACM Transactions on Graphics, vol. 35, No. 6, Article No. 192, 2016, pp. 1-12, https://doi.org/10.1145/2980179.2980254.
Takeda et al., "Robust Kernel Regression for Restoration and Reconstruction of Images from Sparse Noisy Data", 2006 International Conference on Image Processing, Atlanta, GA, USA, 2006, pp. 1257-1260, doi: 10.1109/ICIP.2006.312573.
Achanta et al., "SLIC Superpixels", EPFL Technical Report 149300, Jun. 2010, 15 pgs.
Hirschmuller et al., "Memory Efficient Semi-Global Matching", ISPRS Annals of the Photogrammetry, Remote Sensing and Spatial Information Sciences, vol. I-3, 2012, XXII ISPRS Congress, Aug. 25-Sep. 1, 2012, Melbourne, Australia, 6 pgs.
Roszkowski, Mikołaj, "Stereo matching with superpixels", Proc. SPIE 8454, Photonics Applications in Astronomy, Communications, Industry, and High-Energy Physics Experiments 2012, 84540V, Oct. 15, 2012, https://doi.org/10.1117/12.2000139.
Zabih et al., "Non-parametric Local Transforms for Computing Visual Correspondence", ECCV 1994 Proceedings of the third European Conference on Computer Vision, May 7, 1994, vol. 3, pp. 151-158.
Extended European Search Report for EP Application No. 11781313.9, Completed Oct. 1, 2013, Mailed Oct. 8, 2013, 6 pgs.
Extended European Search Report for EP Application No. 13810429.4, Completed Jan. 7, 2016, Mailed Jan. 15, 2016, 6 pgs.
Extended European Search Report for European Application EP12782935.6, completed Aug. 28, 2014, mailed Sep. 4, 2014, 7 pgs.
Extended European Search Report for European Application EP12804266.0, Report Completed Jan. 27, 2015, Mailed Feb. 3, 2015, 7 pgs.
Extended European Search Report for European Application EP12835041.0, Report Completed Jan. 28, 2015, Mailed Feb. 4, 2015, 6 pgs.
Extended European Search Report for European Application EP13751714.0, completed Aug. 5, 2015, mailed Aug. 18, 2015, 8 pgs.
Extended European Search Report for European Application EP13810229.8, Report Completed Apr. 14, 2016, Mailed Apr. 21, 2016, 7 pgs.
Extended European Search Report for European Application No. 10832330.4, completed Sep. 26, 2013, Mailed Oct. 4, 2013, 7 pgs.
Extended European Search Report for European Application No. 11848308.0, Search completed Jan. 13, 2016, Mailed Jan. 22, 2016, 10 pgs.
Extended European Search Report for European Application No. 13830945.5, Search completed Jun. 28, 2016, Mailed Jul. 7, 2016, 14 pgs.
Extended European Search Report for European Application No. 13841613.6, Search completed Jul. 18, 2016, Mailed Jul. 26, 2016, 8 pgs.
Extended European Search Report for European Application No. 14763087.5, Search completed Dec. 7, 2016, Mailed Dec. 19, 2016, 9 pgs.
Extended European Search Report for European Application No. 14860103.2, Search completed Feb. 23, 2017, Mailed Mar. 3, 2017, 7 pgs.
Extended European Search Report for European Application No. 14865463.5, Search completed May 30, 2017, Mailed Jun. 8, 2017, 6 Pgs.
Extended European Search Report for European Application No. 15847754.7, Search completed Jan. 25, 2018, Mailed Feb. 9, 2018, 8 pgs.
Extended European Search Report for European Application No. 18151530.5, Completed Mar. 28, 2018, Mailed Apr. 20, 2018,11 pages.
Extended European Search Report for European Application No. 18205326.4, Search completed Jan. 8, 2019 , Mailed Jan. 18, 2019, 9 Pgs.
Extended European Search Report for European Application No. 21169308.0, Search completed Aug. 2, 2021, Mailed Aug. 9, 2021, 9 Pgs.
Extended Search Report for European Application No. 21155002.5, Search completed Jun. 7, 2021 , Mailed Jun. 11, 2021, 14 Pgs.
International Preliminary Report on Patentability for International Application No. PCT/US2009/044687, Completed Jul. 30, 2010, 9 pgs.
International Preliminary Report on Patentability for International Application No. PCT/US2012/056151, Report Issued Mar. 25, 2014, 9 pgs.
International Preliminary Report on Patentability for International Application No. PCT/US2012/056166, Report Issued Mar. 25, 2014, Report Mailed Apr. 3, 2014 8 pgs.
International Preliminary Report on Patentability for International Application No. PCT/US2012/058093, Report Issued Sep. 18, 2013, Mailed Oct. 22, 2013, 40 pgs.
International Preliminary Report on Patentability for International Application No. PCT/US2012/059813, Search Completed Apr. 15, 2014, 7 pgs.
International Preliminary Report on Patentability for International Application No. PCT/US2013/059991, Issued Mar. 17, 2015, Mailed Mar. 26, 2015, 8 pgs.
International Preliminary Report on Patentability for International Application PCT /US2015/032467, Report issued Nov. 29, 2016, Mailed Dec. 8, 2016, 9 Pgs.
International Preliminary Report on Patentability for International Application PCT/US10/057661, issued May 22, 2012, mailed May 31, 2012, 10 pages.

(56) References Cited

OTHER PUBLICATIONS

International Preliminary Report on Patentability for International Application PCT/US11/036349, Report Issued Nov. 13, 2012, Mailed Nov. 22, 2012, 9 pages.
International Preliminary Report on Patentability for International Application PCT/US13/56065, Issued Feb. 24, 2015, Mailed Mar. 5, 2015, 4 pgs.
International Preliminary Report on Patentability for International Application PCT/US2011/064921, issued Jun. 18, 2013, mailed Jun. 27, 2013, 14 pgs.
International Preliminary Report on Patentability for International Application PCT/US2013/024987, Mailed Aug. 12, 2014, 13 pgs.
International Preliminary Report on Patentability for International Application PCT/US2013/027146, completed Aug. 26, 2014, Mailed Sep. 4, 2014, 10 pgs.
International Preliminary Report on Patentability for International Application PCT/US2013/039155, completed Nov. 4, 2014, Mailed Nov. 13, 2014, 10 pgs.
International Preliminary Report on Patentability for International Application PCT/US2013/046002, issued Dec. 31, 2014, Mailed Jan. 8, 2015, 6 pgs.
International Preliminary Report on Patentability for International Application PCT/US2013/048772, issued Dec. 31, 2014, Mailed Jan. 8, 2015, 8 pgs.
International Preliminary Report on Patentability for International Application PCT/US2013/056502, Issued Feb. 24, 2015, Mailed Mar. 5, 2015, 7 pgs.
International Preliminary Report on Patentability for International Application PCT/US2013/069932, issued May 19, 2015, Mailed May 28, 2015, 12 pgs.
International Preliminary Report on Patentability for International Application PCT/US2014/017766, issued Aug. 25, 2015, Mailed Sep. 3, 2015, 8 pgs.
International Preliminary Report on Patentability for International Application PCT/US2014/018084, issued Aug. 25, 2015, Mailed Sep. 3, 2015, 11 pgs.
International Preliminary Report on Patentability for International Application PCT/US2014/018116, issued Sep. 15, 2015, Mailed Sep. 24, 2015, 12 pgs.
International Preliminary Report on Patentability for International Application PCT/US2014/021439, issued Sep. 15, 2015, Mailed Sep. 24, 2015, 9 pgs.
International Preliminary Report on Patentability for International Application PCT/US2014/022118, issued Sep. 8, 2015, Mailed Sep. 17, 2015, 4 pgs.
International Preliminary Report on Patentability for International Application PCT/US2014/022123, issued Sep. 8, 2015, Mailed Sep. 17, 2015, 4 pgs.
International Preliminary Report on Patentability for International Application PCT/US2014/022774, issued Sep. 22, 2015, Mailed Oct. 1, 2015, 5 pgs.
International Preliminary Report on Patentability for International Application PCT/US2014/023762, issued Mar. 2, 2015, Mailed Mar. 9, 2015, 10 pgs.
International Preliminary Report on Patentability for International Application PCT/US2014/024407, issued Sep. 15, 2015, Mailed Sep. 24, 2015, 8 pgs.
International Preliminary Report on Patentability for International Application PCT/US2014/024903, issued Sep. 15, 2015, Mailed Sep. 24, 2015, 12 pgs.
International Preliminary Report on Patentability for International Application PCT/US2014/024947, issued Sep. 15, 2015, Mailed Sep. 24, 2015, 7 pgs.
International Preliminary Report on Patentability for International Application PCT/US2014/025100, issued Sep. 15, 2015, Mailed Sep. 24, 2015, 4 pgs.
International Preliminary Report on Patentability for International Application PCT/US2014/025904, issued Sep. 15, 2015, Mailed Sep. 24, 2015, 5 pgs.
International Preliminary Report on Patentability for International Application PCT/US2014/028447, issued Sep. 15, 2015, Mailed Sep. 24, 2015, 7 pgs.
International Preliminary Report on Patentability for International Application PCT/US2014/029052, issued Sep. 15, 2015, Mailed Sep. 24, 2015, 9 Pgs.
International Preliminary Report on Patentability for International Application PCT/US2014/030692, issued Sep. 15, 2015, Mailed Sep. 24, 2015, 6 pgs.
International Preliminary Report on Patentability for International Application PCT/US2014/064693, issued May 10, 2016, Mailed May 19, 2016, 14 pgs.
International Preliminary Report on Patentability for International Application PCT/US2014/066229, issued May 24, 2016, Mailed Jun. 2, 2016, 9 pgs.
International Preliminary Report on Patentability for International Application PCT/US2014/067740, issued May 31, 2016, Mailed Jun. 9, 2016, 9 pgs.
International Preliminary Report on Patentability for International Application PCT/US2015/019529, issued Sep. 13, 2016, Mailed Sep. 22, 2016, 9 pgs.
International Preliminary Report on Patentability for International Application PCT/US2015/053013, issued Apr. 4, 2017, Mailed Apr. 13, 2017, 8 pgs.
International Preliminary Report on Patentability for International Application PCT/US13/62720, Issued Mar. 31, 2015, Mailed Apr. 9, 2015, 8 pgs.
International Search Report and Written Opinion for International Application No. PCT/US13/46002, completed Nov. 13, 2013, Mailed Nov. 29, 2013, 7 pgs.
International Search Report and Written Opinion for International Application No. PCT/US13/56065, Completed Nov. 25, 2013, Mailed Nov. 26, 2013, 8 pgs.
International Search Report and Written Opinion for International Application No. PCT/US13/59991, Completed Feb. 6, 2014, Mailed Feb. 26, 2014, 8 pgs.
International Search Report and Written Opinion for International Application No. PCT/US2012/056166, Report Completed Nov. 10, 2012, Mailed Nov. 20, 2012, 9 pgs.
International Search Report and Written Opinion for International Application No. PCT/US2013/024987, Completed Mar. 27, 2013, Mailed Apr. 15, 2013, 14 pgs.
International Search Report and Written Opinion for International Application No. PCT/US2013/027146, completed Apr. 2, 2013, 11 pgs.
International Search Report and Written Opinion for International Application No. PCT/US2013/039155, completed Jul. 1, 2013, Mailed Jul. 11, 2013, 11 pgs.
International Search Report and Written Opinion for International Application No. PCT/US2013/048772, Completed Oct. 21, 2013, Mailed Nov. 8, 2013, 6 pgs.
International Search Report and Written Opinion for International Application No. PCT/US2013/056502, Completed Feb. 18, 2014, Mailed Mar. 19, 2014, 7 pgs.
International Search Report and Written Opinion for International Application No. PCT/US2013/069932, Completed Mar. 14, 2014, Mailed Apr. 14, 2014, 12 pgs.
International Search Report and Written Opinion for International Application No. PCT/US2015/019529, completed May 5, 2015, Mailed Jun. 8, 2015, 11 pgs.
International Search Report and Written Opinion for International Application No. PCT/US2015/032467, Search completed Jul. 27, 2015, Mailed Aug. 19, 2015, 10 Pgs.
International Search Report and Written Opinion for International Application No. PCT/US2015/053013, completed Dec. 1, 2015, Mailed Dec. 30, 2015, 9 pgs.
International Search Report and Written Opinion for International Application PCT/US11/36349, mailed Aug. 22, 2011, 11 pgs.
International Search Report and Written Opinion for International Application PCT/US13/62720, completed Mar. 25, 2014, Mailed Apr. 21, 2014, 9 pgs.

(56) References Cited

OTHER PUBLICATIONS

International Search Report and Written Opinion for International Application PCT/US14/17766, completed May 28, 2014, Mailed Jun. 18, 2014, 9 pgs.
International Search Report and Written Opinion for International Application PCT/US14/18084, completed May 23, 2014, Mailed Jun. 10, 2014, 12 pgs.
International Search Report and Written Opinion for International Application PCT/US14/18116, Report completed May 13, 2014, 12 pgs.
International Search Report and Written Opinion for International Application PCT/US14/21439, completed Jun. 5, 2014, Mailed Jun. 20, 2014, 10 pgs.
International Search Report and Written Opinion for International Application PCT/US14/22118, completed Jun. 9, 2014, Mailed, Jun. 25, 2014, 5 pgs.
International Search Report and Written Opinion for International Application PCT/US14/22774 report completed Jun. 9, 2014, Mailed Jul. 14, 2014, 6 pgs.
International Search Report and Written Opinion for International Application PCT/US14/24407, report completed Jun. 11, 2014, Mailed Jul. 8, 2014, 9 pgs.
International Search Report and Written Opinion for International Application PCT/US14/25100, report completed Jul. 7, 2014, Mailed Aug. 7, 2014, 5 pgs.
International Search Report and Written Opinion for International Application PCT/US14/25904 report completed Jun. 10, 2014, Mailed Jul. 10, 2014, 6 pgs.
International Search Report and Written Opinion for International Application PCT/US2009/044687, completed Jan. 5, 2010, mailed Jan. 13, 2010, 9 pgs.
International Search Report and Written Opinion for International Application PCT/US2010/057661, completed Mar. 9, 2011, 14 pgs.
International Search Report and Written Opinion for International Application PCT/US2011/064921, completed Feb. 25, 2011, mailed Mar. 6, 2012, 17 pgs.
International Search Report and Written Opinion for International Application PCT/US2012/037670, Mailed Jul. 18, 2012, Completed Jul. 5, 2012, 9 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/058093, Report completed Nov. 15, 2012, 12 pgs.
International Search Report and Written Opinion for International Application PCT/US2012/059813, completed Dec. 17, 2012, 8 pgs.
International Search Report and Written Opinion for International Application PCT/US2014/022123, completed Jun. 9, 2014, Mailed Jun. 25, 2014, 5 pgs.
International Search Report and Written Opinion for International Application PCT/US2014/023762, Completed May 30, 2014, Mailed Jul. 3, 2014, 6 pgs.
International Search Report and Written Opinion for International Application PCT/US2014/024903, completed Jun. 12, 2014, Mailed, Jun. 27, 2014, 13 pgs.
International Search Report and Written Opinion for International Application PCT/US2014/024947, Completed Jul. 8, 2014, Mailed Aug. 5, 2014, 8 pgs.
International Search Report and Written Opinion for International Application PCT/US2014/028447, completed Jun. 30, 2014, Mailed Jul. 21, 2014, 8 pgs.
International Search Report and Written Opinion for International Application PCT/US2014/029052, completed Jun. 30, 2014, Mailed Jul. 24, 2014, 10 pgs.
International Search Report and Written Opinion for International Application PCT/US2014/030692, completed Jul. 28, 2014, Mailed Aug. 27, 2014, 7 pgs.
International Search Report and Written Opinion for International Application PCT/US2014/064693, Completed Mar. 7, 2015, Mailed Apr. 2, 2015, 15 pgs.
International Search Report and Written Opinion for International Application PCT/US2014/066229, Completed Mar. 6, 2015, Mailed Mar. 19, 2015, 9 pgs.
International Search Report and Written Opinion for International Application PCT/US2014/067740, Completed Jan. 29, 2015, mailed Mar. 3, 2015, 10 pgs.
Office Action for U.S. Appl. No. 12/952,106, dated Aug. 16, 2012, 12 pgs.
Supplementary European Search Report for EP Application No. 13831768.0, Search completed May 18, 2016, Mailed May 30, 2016, 13 pgs.
Supplementary European Search Report for European Application 09763194.9, completed Nov. 7, 2011, mailed Nov. 29, 2011, 9 pgs.
"Exchangeable image file format for digital still cameras: Exif Version 2.2", Japan Electronics and Information Technology Industries Association, Prepared by Technical Standardization Committee on AV & IT Storage Systems and Equipment, JEITA CP-3451, Apr. 2002, Retrieved from: http://www.exif.org/Exif2-2.PDF, 154 pgs.
"File Formats Version 6", Alias Systems, 2004, 40 pgs.
"Light fields and computational photography", Stanford Computer Graphics Laboratory, Retrieved from: http://graphics.stanford.edu/projects/lightfield/, Earliest publication online: Feb. 10, 1997, 3 pgs.
Aufderheide et al., "A MEMS-based Smart Sensor System for Estimation of Camera Pose for Computer Vision Applications", Research and Innovation Conference 2011, Jul. 29, 2011, pp. 1-10.
Baker et al., "Limits on Super-Resolution and How to Break Them", IEEE Transactions on Pattern Analysis and Machine Intelligence, Sep. 2002, vol. 24, No. 9, pp. 1167-1183.
Barron et al., "Intrinsic Scene Properties from a Single RGB-D Image", 2013 IEEE Conference on Computer Vision and Pattern Recognition, Jun. 23-28, 2013, Portland, OR, USA, pp. 17-24.
Bennett et al., "Multispectral Bilateral Video Fusion", 2007 IEEE Transactions on Image Processing, May 2007, published Apr. 16, 2007, vol. 16, No. 5, pp. 1185-1194.
Bennett et al., "Multispectral Video Fusion", Computer Graphics (ACM SIGGRAPH Proceedings), Jul. 25, 2006, published Jul. 30, 2006, 1 pg.
Bertalmio et al., "Image Inpainting", Proceedings of the 27th Annual Conference on Computer Graphics and Interactive Techniques, 2000, ACM Pres/Addison-Wesley Publishing Co., pp. 417-424.
Bertero et al., "Super-resolution in computational imaging", Micron, Jan. 1, 2003, vol. 34, Issues 6-7, 17 pgs.
Bishop et al., "Full-Resolution Depth Map Estimation from an Aliased Plenoptic Light Field", ACCV Nov. 8, 2010, Part II, LNCS 6493, pp. 186-200.
Bishop et al., "Light Field Superresolution", Computational Photography (ICCP), 2009 IEEE International Conference, Conference Date Apr. 16-17, published Jan. 26, 2009, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, published Aug. 18, 2011, pp. 972-986.
Borman, "Topics in Multiframe Superresolution Restoration", Thesis of Sean Borman, Apr. 2004, 282 pgs.
Borman et al, "Image Sequence Processing", Dekker Encyclopedia of Optical Engineering, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 28, 1998, vol. 3653, 10 pgs.
Borman et al., "Image Resampling and Constraint Formulation for Multi-Frame Super-Resolution Restoration", Proc. SPIE, published Jul. 1, 2003, vol. 5016, 12 pgs.
Borman et al., "Linear models for multi-frame super-resolution restoration under non-affine registration and spatially varying PSF", Proc. SPIE, May 21, 2004, vol. 5299, 12 pgs.

(56) References Cited

OTHER PUBLICATIONS

Borman et al., "Nonlinear Prediction Methods for Estimation of Clique Weighting Parameters in NonGaussian Image Models", Proc. SPIE, Sep. 22, 1998, vol. 3459, 9 pgs.
Borman et al., "Simultaneous Multi-Frame MAP Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, Aug. 2006, vol. 15, Issue 8, published Jul. 17, 2006, pp. 2239-2248.
Boye et al., "Comparison of Subpixel Image Registration Algorithms", Proc. of SPIE—IS&T Electronic Imaging, Feb. 3, 2009, vol. 7246, pp. 72460X-1-72460X-9; doi: 10.1117/12.810369.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, May 13, 2010, 11 pgs.
Bruckner et al., "Thin wafer-level camera lenses inspired by insect compound eyes", Optics Express, Nov. 22, 2010, vol. 18, No. 24, pp. 24379-24394.
Bryan et al., "Perspective Distortion from Interpersonal Distance Is an Implicit Visual Cue for Social Judgments of Faces", PLOS One, vol. 7, Issue 9, Sep. 26, 2012, e45301, doi:10.1371/journal.pone. 0045301, 9 pages.
Capel, "Image Mosaicing and Super-resolution", Retrieved on Nov. 10, 2012, Retrieved from the Internet at URL:<http://citeseerx.ist.psu.edu/viewdoc/download?doi=1 0.1.1.226.2643&rep=rep1&type=pdf>, 2001, 269 pgs.
Carroll et al., "Image Warps for Artistic Perspective Manipulation", ACM Transactions on Graphics (TOG), vol. 29, No. 4, Jul. 26, 2010, Article No. 127, 9 pgs.
Chan et al., "Extending the Depth of Field in a Compound-Eye Imaging System with Super-Resolution Reconstruction", Proceedings—International Conference on Pattern Recognition, Jan. 1, 2006, vol. 3, pp. 623-626.
Chan et al., "Investigation of Computational Compound-Eye Imaging System with Super-Resolution Reconstruction", IEEE, ISASSP, Jun. 19, 2006, pp. 1177-1180.
Chan et al., "Super-resolution reconstruction in a computational compound-eye imaging system", Multidim Syst Sign Process, published online Feb. 23, 2007, vol. 18, pp. 83-101.
Chen et al., "Image Matting with Local and Nonlocal Smooth Priors", CVPR '13 Proceedings of the 2013 IEEE Conference on Computer Vision and Pattern Recognition, Jun. 23, 2013, pp. 1902-1907.
Chen et al., "Interactive deformation of light fields", Symposium on Interactive 3D Graphics, 2005, pp. 139-146.
Chen et al., "KNN matting", 2012 IEEE Conference on Computer Vision and Pattern Recognition, Jun. 16-21, 2012, Providence, RI, USA, pp. 869-876.
Chen et al., "KNN Matting", IEEE Transactions on Pattern Analysis and Machine Intelligence, Sep. 2013, vol. 35, No. 9, pp. 2175-2188.
Collins et al., "An Active Camera System for Acquiring Multi-View Video", IEEE 2002 International Conference on Image Processing, Date of Conference: Sep. 22-25, 2002, Rochester, NY, 4 pgs.
Cooper et al., "The perceptual basis of common photographic practice", Journal of Vision, vol. 12, No. 5, Article 8, May 25, 2012, pp. 1-14.
Crabb et al., "Real-time foreground segmentation via range and color imaging", 2008 IEEE Computer Society Conference on Computer Vision and Pattern Recognition Workshops, Anchorage, AK, USA, Jun. 23-28, 2008, pp. 1-5.
Debevec et al., "Recovering High Dynamic Range Radiance Maps from Photographs", Computer Graphics (ACM SIGGRAPH Proceedings), Aug. 16, 1997, 10 pgs.

Do, Minh N., "Immersive Visual Communication with Depth", Presented at Microsoft Research, Jun. 15, 2011, Retrieved from: http://minhdo.ece.illinois.edu/talks/ImmersiveComm.pdf, 42 pgs.
Do et al., "Immersive Visual Communication", IEEE Signal Processing Magazine, vol. 28, Issue 1, Jan. 2011, DOI: 10.1109/MSP. 2010.939075, Retrieved from: http://minhdo.ece.illinois.edu/publications/ImmerComm_SPM.pdf, pp. 58-66.
Drouin et al., "Fast Multiple-Baseline Stereo with Occlusion", Fifth International Conference on 3-D Digital Imaging and Modeling (3DIM'05), Ottawa, Ontario, Canada, Jun. 13-16, 2005, pp. 540-547.
Drouin et al., "Geo-Consistency for Wide Multi-Camera Stereo", 2005 IEEE Computer Society Conference on Computer Vision and Pattern Recognition (CVPR'05), vol. 1, Jun. 20-25, 2005, pp. 351-358.
Drouin et al., "Improving Border Localization of Multi-Baseline Stereo Using Border-Cut", International Journal of Computer Vision, Jul. 5, 2006, vol. 83, Issue 3, 8 pgs.
Drulea et al., "Motion Estimation Using the Correlation Transform", IEEE Transactions on Image Processing, Aug. 2013, vol. 22, No. 8, pp. 3260-3270, first published May 14, 2013.
Duparre et al., "Artificial apposition compound eye fabricated by micro-optics technology", Applied Optics, Aug. 1, 2004, vol. 43, No. 22, pp. 4303-4310.
Duparre et al., "Artificial compound eye zoom camera", Bioinspiration & Biomimetics, Nov. 21, 2008, vol. 3, pp. 1-6.
Duparre et al., "Artificial compound eyes—different concepts and their application to ultra flat image acquisition sensors", MOEMS and Miniaturized Systems IV, Proc. SPIE 5346, Jan. 24, 2004, pp. 89-100.
Duparre et al., "Chirped arrays of refractive ellipsoidal microlenses for aberration correction under oblique incidence", Optics Express, Dec. 26, 2005, vol. 13, No. 26, pp. 10539-10551.
Duparre et al., "Micro-optical artificial compound eyes", Bioinspiration & Biomimetics, Apr. 6, 2006, vol. 1, pp. R1-R16.
Duparre et al., "Microoptical artificial compound eyes—from design to experimental verification of two different concepts", Proc. of SPIE, Optical Design and Engineering II, vol. 5962, Oct. 17, 2005, pp. 59622A-1-59622A-12.
Duparre et al., "Microoptical Artificial Compound Eyes—Two Different Concepts for Compact Imaging Systems", 11th Microoptics Conference, Oct. 30-Nov. 2, 2005, 2 pgs.
Duparre et al., "Microoptical telescope compound eye", Optics Express, Feb. 7, 2005, vol. 13, No. 3, pp. 889-903.
Duparre et al., "Micro-optically fabricated artificial apposition compound eye", Electronic Imaging—Science and Technology, Prod. SPIE 5301, Jan. 2004, pp. 25-33.
Duparre et al., "Novel Optics/Micro-Optics for Miniature Imaging Systems", Proc. of SPIE, Apr. 21, 2006, vol. 6196, pp. 619607-1-619607-15.
Duparre et al., "Theoretical analysis of an artificial superposition compound eye for application in ultra flat digital image acquisition devices", Optical Systems Design, Proc. SPIE 5249, Sep. 2003, pp. 408-418.
Duparre et al., "Thin compound-eye camera", Applied Optics, May 20, 2005, vol. 44, No. 15, pp. 2949-2956.
Duparre et al., "Ultra-Thin Camera Based on Artificial Apposition Compound Eyes", 10th Microoptics Conference, Sep. 1-3, 2004, 2 pgs.
Eng et al., "Gaze correction for 3D tele-immersive communication system", IVMSP Workshop, 2013 IEEE 11th. IEEE, Jun. 10, 2013, 4 pgs.
Fanaswala, "Regularized Super-Resolution of Multi-View Images", Retrieved on Nov. 10, 2012 (Nov. 10, 2012). Retrieved from the Internet at URL:<http://www.site.uottawa.ca/-edubois/theses/Fanaswala_thesis.pdf>, 2009, 163 pgs.
Fang et al., "Volume Morphing Methods for Landmark Based 3D Image Deformation", SPIE vol. 2710, Proc. 1996 SPIE Intl Symposium on Medical Imaging, Newport Beach, CA, Feb. 10, 1996, pp. 404-415.
Farrell et al., "Resolution and Light Sensitivity Tradeoff with Pixel Size", Proceedings of the SPIE Electronic Imaging 2006 Conference, Feb. 2, 2006, vol. 6069, 8 pgs.

(56) References Cited

OTHER PUBLICATIONS

Farsiu et al., "Advances and Challenges in Super-Resolution", International Journal of Imaging Systems and Technology, Aug. 12, 2004, vol. 14, pp. 47-57.
Farsiu et al., "Fast and Robust Multiframe Super Resolution", IEEE Transactions on Image Processing, Oct. 2004, published Sep. 3, 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, date of publication Dec. 12, 2005, pp. 141-159.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.
Fischer et al., "Optical System Design", 2nd Edition, SPIE Press, Feb. 14, 2008, pp. 191-198.
Fischer et al., "Optical System Design", 2nd Edition, SPIE Press, Feb. 14, 2008, pp. 49-58.
Gastal et al., "Shared Sampling for Real-Time Alpha Matting", Computer Graphics Forum, EUROGRAPHICS 2010, vol. 29, Issue 2, May 2010, pp. 575-584.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Goldman et al., "Video Object Annotation, Navigation, and Composition", In Proceedings of UIST 2008, Oct. 19-22, 2008, Monterey CA, USA, pp. 3-12.
Gortler et al., "The Lumigraph", In Proceedings of SIGGRAPH 1996, published Aug. 1, 1996, pp. 43-54.
Gupta et al., "Perceptual Organization and Recognition of Indoor Scenes from RGB-D Images", 2013 IEEE Conference on Computer Vision and Pattern Recognition, Jun. 23-28, 2013, Portland, OR, USA, pp. 564-571.
Hacohen et al., "Non-Rigid Dense Correspondence with Applications for Image Enhancement", ACM Transactions on Graphics, vol. 30, No. 4, Aug. 7, 2011, 9 pgs.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, published Nov. 19, 2007, vol. 16, No. 12, pp. 2953-2964.
Hasinoff et al., "Search-and-Replace Editing for Personal Photo Collections", 2010 International Conference: Computational Photography (ICCP) Mar. 2010, pp. 1-8.
Hernandez-Lopez et al., "Detecting objects using color and depth segmentation with Kinect sensor", Procedia Technology, vol. 3, Jan. 1, 2012, pp. 196-204, XP055307680, ISSN: 2212-0173, DOI: 10.1016/j.protcy.2012.03.021.
Holoeye Photonics AG, "LC 2012 Spatial Light Modulator (transmissive)", Sep. 18, 2013, retrieved from https://web.archive.org/web/20130918151716/http://holoeye.com/spatial-light-modulators/lc-2012-spatial-light-modulator/ on Oct. 20, 2017, 3 pages.
Holoeye Photonics AG, "Spatial Light Modulators", Oct. 2, 2013, Brochure retrieved from https://web.archive.org/web/20131002061028/http://holoeye.com/wp-content/uploads/Spatial_Light_Modulators.pdf on Oct. 13, 2017, 4 pgs.
Holoeye Photonics AG, "Spatial Light Modulators", Sep. 18, 2013, retrieved from https://web.archive.org/web/20130918113140/http://holoeye.com/spatial-light-modulators/ on Oct. 13, 2017, 4 pgs.
Horisaki et al., "Irregular Lens Arrangement Design to Improve Imaging Performance of Compound-Eye Imaging Systems", Applied Physics Express, Jan. 29, 2010, vol. 3, pp. 022501-1-022501-3.
Horisaki et al., "Superposition Imaging for Three-Dimensionally Space-Invariant Point Spread Functions", Applied Physics Express, Oct. 13, 2011, vol. 4, pp. 112501-1-112501-3.
Horn et al., "LightShop: Interactive Light Field Manipulation and Rendering", In Proceedings of 13D, Jan. 1, 2007, pp. 121-128.
Isaksen et al., "Dynamically Reparameterized Light Fields", In Proceedings of SIGGRAPH 2000, pp. 297-306.
Izadi et al., "KinectFusion: Real-time 3D Reconstruction and Interaction Using a Moving Depth Camera", UIST'11, Oct. 16-19, 2011, Santa Barbara, CA, pp. 559-568.
Janoch et al., "A category-level 3-D object dataset: Putting the Kinect to work", 2011 IEEE International Conference on Computer Vision Workshops (ICCV Workshops), Nov. 6-13, 2011, Barcelona, Spain, pp. 1168-1174.
Jarabo et al., "Efficient Propagation of Light Field Edits", In Proceedings of SIACG 2011, pp. 75-80.
Jiang et al., "Panoramic 3D Reconstruction Using Rotational Stereo Camera with Simple Epipolar Constraints", 2006 IEEE Computer Society Conference on Computer Vision and Pattern Recognition (CVPR'06), Jun. 17-22, 2006, vol. 1, New York, NY, USA, pp. 371-378.
Joshi, Neel S. , "Color Calibration for Arrays of Inexpensive Image Sensors", Master's with Distinction in Research Report, Stanford University, Department of Computer Science, Mar. 2004, 30 pgs.
Joshi et al., "Synthetic Aperture Tracking: Tracking Through Occlusions", I CCV IEEE 11th International Conference on Computer Vision; Publication [online]. Oct. 2007 [retrieved Jul. 28, 2014]. Retrieved from the Internet: <URL: http://ieeexplore.ieee.org/stamp/stamp.jsp?tp=&arnumber=4409032&isnumber=4408819>; pp. 1-8.
Kang et al., "Handling Occlusions in Dense Multi-view Stereo", Computer Vision and Pattern Recognition, 2001, vol. 1, pp. 1-103-1-110.
Kim, "Scene Reconstruction from a Light Field", Master Thesis, Sep. 1, 2010, pp. 1-72, XP055493023, Zürich, Retrieved from the Internet: URL:https://graphics.ethz.ch/~kimc/publications/changil-kim-ms-thesis-2010-compressed.pdf.
Kim et al., "Scene reconstruction from high spatio-angular resolution light fields", ACM Transactions on Graphics (TOG)—SIGGRAPH 2013 Conference Proceedings, vol. 32 Issue 4, Article 73, Jul. 21, 2013, 11 pages.
Kitamura et al., "Reconstruction of a high-resolution image on a compound-eye image-capturing system", Applied Optics, Mar. 10, 2004, vol. 43, No. 8, pp. 1719-1727.
Konolige, Kurt , "Projected Texture Stereo", 2010 IEEE International Conference on Robotics and Automation, May 3-7, 2010, pp. 148-155.
Krishnamurthy et al., "Compression and Transmission of Depth Maps for Image-Based Rendering", Image Processing, 2001, pp. 828-831.
Kubota et al., "Reconstructing Dense Light Field From Array of Multifocus Images for Novel View Synthesis", IEEE Transactions on Image Processing, vol. 16, No. 1, Jan. 2007, pp. 269-279.
Kutulakos et al., "Occluding Contour Detection Using Affine Invariants and Purposive Viewpoint Control", Computer Vision and Pattern Recognition, Proceedings CVPR 94, Seattle, Washington, Jun. 21-23, 1994, 8 pgs.
Lai et al., "A Large-Scale Hierarchical Multi-View RGB-D Object Dataset", Proceedings—IEEE International Conference on Robotics and Automation, Conference Date May 9-13, 2011, 8 pgs., DOI:10.1109/ICRA.201135980382.
Lane et al., "A Survey of Mobile Phone Sensing", IEEE Communications Magazine, vol. 48, Issue 9, Sep. 2010, pp. 140-150.
Lee et al., "Automatic Upright Adjustment of Photographs", IEEE Conference on Computer Vision and Pattern Recognition (CVPR), 2012, pp. 877-884.

(56) References Cited

OTHER PUBLICATIONS

Lee et al., "Electroactive Polymer Actuator for Lens-Drive Unit in Auto-Focus Compact Camera Module", ETRI Journal, vol. 31, No. 6, Dec. 2009, pp. 695-702.
Lee et al., "Nonlocal matting", CVPR 2011, Jun. 20-25, 2011, pp. 2193-2200.
Lensvector, "How LensVector Autofocus Works", 2010, printed Nov. 2, 2012 from http://www.lensvector.com/overview.html, 1 pg.
Levin et al., "A Closed Form Solution to Natural Image Matting", IEEE Conference on Computer Vision and Pattern Recognition (CVPR), 2006, vol. 1, pp. 61-68.
Levin et al., "Spectral Matting", 2007 IEEE Conference on Computer Vision and Pattern Recognition, Jun. 17-22, 2007, Minneapolis, MN, USA, pp. 1-8.
Levoy, "Light Fields and Computational Imaging", IEEE Computer Society, Sep. 1, 2006, vol. 39, Issue No. 8, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution", Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.
Li et al., "Fusing Images With Different Focuses Using Support Vector Machines", IEEE Transactions on Neural Networks, vol. 15, No. 6, Nov. 8, 2004, pp. 1555-1561.
Lim, Jongwoo , "Optimized Projection Pattern Supplementing Stereo Systems", 2009 IEEE International Conference on Robotics and Automation, May 12-17, 2009, pp. 2823-2829.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Martinez et al., "Simple Telemedicine for Developing Regions: Camera Phones and Paper-Based Microfluidic Devices for Real-Time, Off-Site Diagnosis", Analytical Chemistry (American Chemical Society), vol. 80, No. 10, May 15, 2008, pp. 3699-3707.
Mcguire et al., "Defocus video matting", ACM Transactions on Graphics (TOG)—Proceedings of ACM SIGGRAPH 2005, vol. 24, Issue 3, Jul. 2005, pp. 567-576.
Merkle et al., "Adaptation and optimization of coding algorithms for mobile 3DTV", Mobile3DTV Project No. 216503, Nov. 2008, 55 pgs.
Mitra et al., "Light Field Denoising, Light Field Superresolution and Stereo Camera Based Refocussing using a GMM Light Field Patch Prior", Computer Vision and Pattern Recognition Workshops (CVPRW), 2012 IEEE Computer Society Conference on Jun. 16-21, 2012, pp. 22-28.
Moreno-Noguer et al., "Active Refocusing of Images and Videos", ACM Transactions on Graphics (TOG)—Proceedings of ACM SIGGRAPH 2007, vol. 26, Issue 3, Jul. 2007, 10 pages.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 14, 2006, pp. 30-38.
Ng, "Digital Light Field Photography", Thesis, Jul. 2006, 203 pgs.
Ng et al., "Light Field Photography with a Hand-held Plenoptic Camera", Stanford Tech Report CTSR 2005-02, Apr. 20, 2005, pp. 1-11.
Ng et al., "Super-Resolution Image Restoration from Blurred Low-Resolution Images", Journal of Mathematical Imaging and Vision, 2005, vol. 23, pp. 367-378.
Nguyen et al., "Error Analysis for Image-Based Rendering with Depth Information", IEEE Transactions on Image Processing, vol. 18, Issue 4, Apr. 2009, pp. 703-716.
Nguyen et al., "Image-Based Rendering with Depth Information Using the Propagation Algorithm", Proceedings. (ICASSP '05). IEEE International Conference on Acoustics, Speech, and Signal Processing, 2005, vol. 5, Mar. 23-23, 2005, pp. II-589-II-592.
Nishihara, H.K. , "PRISM: A Practical Real-Time Imaging Stereo Matcher", Massachusetts Institute of Technology, A.I. Memo 780, May 1984, 32 pgs.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, Jun. 2007, 12 pgs.
Park et al., "Multispectral Imaging Using Multiplexed Illumination", 2007 IEEE 11th International Conference on Computer Vision, Oct. 14-21, 2007, Rio de Janeiro, Brazil, pp. 1-8.
Park et al., "Super-Resolution Image Reconstruction", IEEE Signal Processing Magazine, May 2003, pp. 21-36.
Parkkinen et al., "Characteristic Spectra of Munsell Colors", Journal of the Optical Society of America A, vol. 6, Issue 2, Feb. 1989, pp. 318-322.
Perwass et al., "Single Lens 3D-Camera with Extended Depth-of-Field", printed from www.raytrix.de, Jan. 22, 2012, 15 pgs.
Pham et al., "Robust Super-Resolution without Regularization", Journal of Physics: Conference Series 124, Jul. 2008, pp. 1-19.
Philips 3D Solutions, "3D Interface Specifications, White Paper", Feb. 15, 2008, 2005-2008 Philips Electronics Nederland B.V., Philips 3D Solutions retrieved from www.philips.com/3dsolutions, 29 pgs., Feb. 15, 2008.
Polight, "Designing Imaging Products Using Reflowable Autofocus Lenses", printed Nov. 2, 2012 from http://www.polight.no/tunable-polymer-autofocus-lens-html--11.html, 1 pg.
Pouydebasque et al., "Varifocal liquid lenses with integrated actuator, high focusing power and low operating voltage fabricated on 200 mm wafers", Sensors and Actuators A: Physical, vol. 172, Issue 1, Dec. 2011, pp. 280-286.
Protter et al., "Generalizing the Nonlocal-Means to Super-Resolution Reconstruction", IEEE Transactions on Image Processing, Dec. 2, 2008, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rajan et al., "Simultaneous Estimation of Super Resolved Scene and Depth Map from Low Resolution Defocused Observations", IEEE Transactions on Pattern Analysis and Machine Intelligence, vol. 25, No. 9, Sep. 8, 2003, pp. 1-16.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Rhemann et al., "A perceptually motivated online benchmark for image matting", 2009 IEEE Conference on Computer Vision and Pattern Recognition, Jun. 20-25, 2009, Miami, FL, USA, pp. 1826-1833.
Robert et al., "Dense Depth Map Reconstruction :A Minimization and Regularization Approach which Preserves Discontinuities", European Conference on Computer Vision (ECCV), pp. 439-451, (1996).
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2002, pp. 208-215.
Sauer et al., "Parallel Computation of Sequential Pixel Updates in Statistical Tomographic Reconstruction", ICIP 1995 Proceedings of the 1995 International Conference on Image Processing, Date of Conference: Oct. 23-26, 1995, pp. 93-96.
Scharstein et al., "High-Accuracy Stereo Depth Maps Using Structured Light", IEEE Computer Society Conference on Computer Vision and Pattern Recognition (CVPR 2003), Jun. 2003, vol. 1, pp. 195-202.

(56) References Cited

OTHER PUBLICATIONS

Seitz et al., "Plenoptic Image Editing", International Journal of Computer Vision 48, Conference Date Jan. 7, 1998, 29 pgs, DOI: 10.1109/ICCV.1998.710696 • Source: DBLP Conference: Computer Vision, Sixth International Conference.
Shotton et al., "Real-time human pose recognition in parts from single depth images", CVPR 2011, Jun. 20-25, 2011, Colorado Springs, CO, USA, pp. 1297-1304.
Shum et al., "A Review of Image-based Rendering Techniques", in Visual Communications and Image Processing 2000, May 2000, vol. 4067, pp. 2-13.
Shum et al., "Pop-Up Light Field: An Interactive Image-Based Modeling and Rendering System", Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5, 2014.
Silberman et al., "Indoor segmentation and support inference from RGBD images", ECCV'12 Proceedings of the 12th European conference on Computer Vision, vol. Part V, Oct. 7-13, 2012, Florence, Italy, pp. 746-760.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", 2008 IEEE Conference on Computer Vision and Pattern Recognition, Jun. 23-28, 2008, 8 pgs.; DOI: 10.1109/CVPR.2008.4587659.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Takeda et al., "Super-resolution Without Explicit Subpixel Motion Estimation", IEEE Transaction on Image Processing, Sep. 2009, vol. 18, No. 9, pp. 1958-1975.
Tallon et al., "Upsampling and Denoising of Depth Maps Via Joint-Segmentation", 20th European Signal Processing Conference, Aug. 27-31, 2012, 5 pgs.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Tao et al., "Depth from Combining Defocus and Correspondence Using Light-Field Cameras", ICCV '13 Proceedings of the 2013 IEEE International Conference on Computer Vision, Dec. 1, 2013, pp. 673-680.
Taylor, "Virtual camera movement: The way of the future?", American Cinematographer vol. 77, No. 9, Sep. 1996, pp. 93-100.
Tseng et al., "Automatic 3-D depth recovery from a single urban-scene image", 2012 Visual Communications and Image Processing, Nov. 27-30, 2012, San Diego, CA, USA, pp. 1-6.
Vaish et al., "Reconstructing Occluded Surfaces Using Synthetic Apertures: Stereo, Focus and Robust Measures", 2006 IEEE Computer Society Conference on Computer Vision and Pattern Recognition (CVPR'06), vol. 2, Jun. 17-22, 2006, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Van Der Wal et al., "The Acadia Vision Processor", Proceedings Fifth IEEE International Workshop on Computer Architectures for Machine Perception, Sep. 13, 2000, Padova, Italy, pp. 31-40.
Veilleux, "CCD Gain Lab: The Theory", University of Maryland, College Park—Observational Astronomy (ASTR 310), Oct. 19, 2006, pp. 1-5 (online], [retrieved on May 13, 2014]. Retrieved from the Internet <URL: http://www.astro.umd.edu/~veilleux/ASTR310/fall06/ccd_theory.pdf, 5 pgs.
Venkataraman et al., "PiCam: An Ultra-Thin High Performance Monolithic Camera Array", ACM Transactions on Graphics (TOG), ACM, US, vol. 32, No. 6, 1 Nov. 1, 2013, pp. 1-13.
Vetro et al., "Coding Approaches for End-To-End 3D TV Systems", Mitsubishi Electric Research Laboratories, Inc., TR2004-137, Dec. 2004, 6 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008, 5 pgs.
Wang, "Calculation of Image Position, Size and Orientation Using First Order Properties", Dec. 29, 2010, OPTI521 Tutorial, 10 pgs.
Wang et al., "Automatic Natural Video Matting with Depth", 15th Pacific Conference on Computer Graphics and Applications, PG '07, Oct. 29-Nov. 2, 2007, Maui, HI, USA, pp. 469-472.
Wang et al., "Image and Video Matting: A Survey", Foundations and Trends, Computer Graphics and Vision, vol. 3, No. 2, 2007, pp. 91-175.
Wang et al., "Soft scissors: an interactive tool for realtime high quality matting", ACM Transactions on Graphics (TOG)—Proceedings of ACM SIGGRAPH 2007, vol. 26, Issue 3, Article 9, Jul. 2007, 6 pages, published Aug. 5, 2007.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, Mar. 11, 2005, vol. 5674, 12 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wikipedia, "Polarizing Filter (Photography)", retrieved from http://en.wikipedia.org/wiki/Polarizing_filter_(photography) on Dec. 12, 2012, last modified on Sep. 26, 2012, 5 pgs.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Wilburn et al., "High-Speed Videography Using a Dense Camera Array", Proceedings of the 2004 IEEE Computer Society Conference on Computer Vision and Pattern Recognition, 2004. CVPR 2004., vol. 2, Jun. 27-Jul. 2, 2004, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Wu et al., "A virtual view synthesis algorithm based on image inpainting", 2012 Third International Conference on Networking and Distributed Computing, Hangzhou, China, Oct. 21-24, 2012, pp. 153-156.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.
Yang et al., "A Real-Time Distributed Light Field Camera", Eurographics Workshop on Rendering (2002), published Jul. 26, 2002, pp. 1-10.
Yang et al., "Superresolution Using Preconditioned Conjugate Gradient Method", Proceedings of SPIE—The International Society for Optical Engineering, Jul. 2002, 8 pgs.

(56) References Cited

OTHER PUBLICATIONS

Yokochi et al., "Extrinsic Camera Parameter Estimation Based-on Feature Tracking and GPS Data", 2006, Nara Institute of Science and Technology, Graduate School of Information Science, LNCS 3851, pp. 369-378.
Zhang et al., "A Self-Reconfigurable Camera Array", Eurographics Symposium on Rendering, published Aug. 8, 2004, 12 pgs.
Zhang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
Zheng et al., "Balloon Motion Estimation Using Two Frames", Proceedings of the Asilomar Conference on Signals, Systems and Computers, IEEE, Comp. Soc. Press, US, vol. 2 of 02, Nov. 4, 1991, pp. 1057-1061.
Zhu et al., "Fusion of Time-of-Flight Depth and Stereo for High Accuracy Depth Maps", 2008 IEEE Conference on Computer Vision and Pattern Recognition, Jun. 23-28, 2008, Anchorage, AK, USA, pp. 1-8.
Zomet et al., "Robust Super-Resolution", IEEE, 2001, pp. 1-6.

\* cited by examiner
† cited by third party

SYSTEM AND METHODS FOR CALIBRATION OF AN ARRAY CAMERA

CROSS-REFERENCE TO RELATED APPLICATION

This application is a continuation of U.S. patent application Ser. No. 18/161,317 entitled "System and Methods for Calibration of an Array Camera" filed on Jan. 30, 2023, and issued on May 14, 2024 as U.S. Pat. No. 11,985,293, which application claims priority as a continuation of U.S. patent application Ser. No. 17/653,267 entitled "System and Methods for Calibration of an Array Camera" filed on Mar. 2, 2022, and issued on Jan. 31, 2023 as U.S. Pat. No. 11,570,423, which application claims priority as a continuation of U.S. patent application Ser. No. 17/208,618 entitled "System and Methods for Calibration of an Array Camera" filed on Mar. 22, 2021, and issued on Mar. 8, 2022 as U.S. Pat. No. 11,272,161, which application claims priority as a continuation of U.S. patent application Ser. No. 16/785,914 entitled "System and Methods for Calibration of an Array Camera" filed on Feb. 10, 2020, and issued on Mar. 23, 2021 as U.S. Pat. No. 10,958,892, which application claims priority as a continuation of U.S. patent application Ser. No. 16/290,672 entitled "System and Methods for Calibration of an Array Camera" filed on Mar. 1, 2019, and issued on Feb. 11, 20202 as U.S. Pat. No. 10,560,684, which application claims priority as a continuation of U.S. patent application Ser. No. 15/987,768 entitled "System and Methods for Calibration of an Array Camera" filed on May 23, 2018, and issued on Mar. 5, 2019 as U.S. Pat. No. 10,225,543, which application claims priority as a continuation of U.S. patent application Ser. No. 14/841,651 entitled "System and Methods for Calibration of an Array Camera" filed on Aug. 31, 2015, and issued on May 29, 2018 as U.S. Pat. No. 9,986,224, which application claims priority as a continuation of U.S. patent application Ser. No. 14/519,005, entitled "System and Methods for Calibration of an Array Camera", filed on Oct. 20, 2014 and issued on Sep. 1, 2015 as U.S. Pat. No. 9,124,864, which application claims priority as a continuation of U.S. patent application Ser. No. 13/792,143, entitled "System and Methods for Calibration of an Array Camera", filed on Mar. 10, 2013 and issued on Oct. 21, 2014 as U.S. Pat. No. 8,866,912, the disclosures of which are incorporated by reference herein in their entireties.

FIELD OF THE INVENTION

The present invention relates to calibration of an array camera. More particularly, this invention relates to systems and methods for calibrating each imaging component in an array camera.

BACKGROUND

An array camera is a camera that is made up of multiple imaging components. Each individual imaging component captures data for a two dimensional image of a view. For purposes of this discussion, an imaging component is an individual camera and/or circuitry including an array of pixels that capture data for a two dimensional image of the view. The data of the two-dimensional images used to generate as a light field. A light field can be used to produce super-resolution (SR) images and other types of images of the view using some or all of the data from the various two dimensional images captured by the individual imaging components.

During the manufacture of most digital cameras (including array cameras) and each imaging component of an array camera, a calibration process is typically performed. In a conventional camera or imaging component, the calibration process typically measures the Modulation Transfer Function (MTF). MTF measurements enable the detection of aberrations that degrade MTF. Some calibration processes may also be used to collect data that characterizes the camera or imaging component in order to adjust the parameters of various image processing algorithms to produce desired images. Typically, the need to obtain precise data during calibration is balanced with the need to keep the manufacturing test overhead to a minimum.

SUMMARY OF THE INVENTION

Systems and methods in accordance with embodiments of this invention enable calibration of array cameras. In accordance with embodiments of this invention, one or more of the imaging components of the array camera are designated as a reference imaging component and each of the remaining imaging components in the array camera is an associate imaging component. Each of the associate imaging components is associated with at least one of the reference imaging components.

In some embodiments in accordance with this invention, the calibration process is performed in the following manner. An image of a test pattern is captured by each of the imaging components of the array camera. Scene independent geometric corrections for the image data captured by the reference imaging component is generated using data of the image of the test pattern captured by the reference component and data describing the test pattern using a processor. A corrected image of the test pattern for the reference component is generated based on the scene independent geometric corrections for the image data captured by the reference imaging component and the image of the test pattern captured by the reference imaging component using the processor.

Scene independent geometric corrections for the image data captured by each of the associate imaging components associated with the reference imaging component using the data of image of the test pattern captured by each associate imaging component and the corrected image of the reference component using the processor.

In some embodiments in accordance with the invention, the test pattern includes a low-contrast slanted edge pattern. In accordance with some of these embodiments, the test pattern includes a plurality of Macbeth Color Chart type patterns inset at different positions in the low-contrast slanted pattern.

In accordance with some embodiments, the test pattern is at a distance of at least 70 percent of the hyperfocal distance of the array camera away from the array camera during the capturing of the image of the test pattern. In accordance with other embodiments, the test pattern is at a distance of at 50 percent of the hyperfocal distance of the array camera away from the array camera during the capturing of the image of the test pattern. In some embodiments in accordance with this invention, at least one pass/fail test of the array camera is performed based on images of the test pattern captured by the plurality of imaging components in the array camera.

In some embodiments in accordance with this invention, the generating of scene independent geometric corrections for the image data captured by the reference imaging component using data of the image of the test pattern captured by the reference component and data describing the test pattern is performed in the following manner. The intersection points in the image of the test pattern captured by the reference imaging component are identified. Uniformity characteristics of the reference imaging component are determined from the identified intersection points in the image of the test pattern captured by the reference imaging component and the test pattern. A set of geometric corrections for the reference imaging component is derived to compensate for low frequency aberrations in the captured image of the test pattern.

In some embodiments, the generating of scene independent geometric corrections for the image data captured by each of the associate imaging components associated with the reference imaging component is performed in the following manner. The intersection points in the test pattern image captured by each of the associate imaging components are identified. The intersection points from the captured test pattern images captured by each of the associate imaging components associated with the reference component are translated in accordance with an expected parallax shift for each of the associate imaging components relative to the reference component. A set of geometric corrections for each of the associate imaging components associated with the reference component to compensate for low frequency aberrations in the captured image of the test pattern by comparing the translated intersections points in the images captured by each of the associate imaging components to corresponding intersection points in the corrected image for the reference component. In some of these embodiments, the expected parallax shift for each of the associate imaging components is based upon at least one of the physical offset of a particular imaging component to the reference imaging component, the behavior of sensor optics in the particular associate imaging component, and distance of the test pattern from the array camera.

In some embodiments, the images captured by the imaging components are stored in order to perform the calibration of the reference component and each of the plurality of associate imaging components at a later time.

In some embodiments, the scene dependent geometric correction information for the image data captured by the reference component is stored in a memory. In some embodiment, the scene dependent geometric correction information for the image data captured by each of the associated imaging components associated with the reference component is stored in a memory.

In accordance with some embodiments, the calibration process further includes generating colorimetric corrections for the image data captured by each imaging component in the array camera using data of the image of the test pattern captured by the each imaging component. In some embodiments, the calibration process further includes generating photometric corrections for the image data captured by each imaging component in the array camera using data of the image of the test pattern captured by the reference component using the processor.

DETAILED DESCRIPTION

Figure 1:
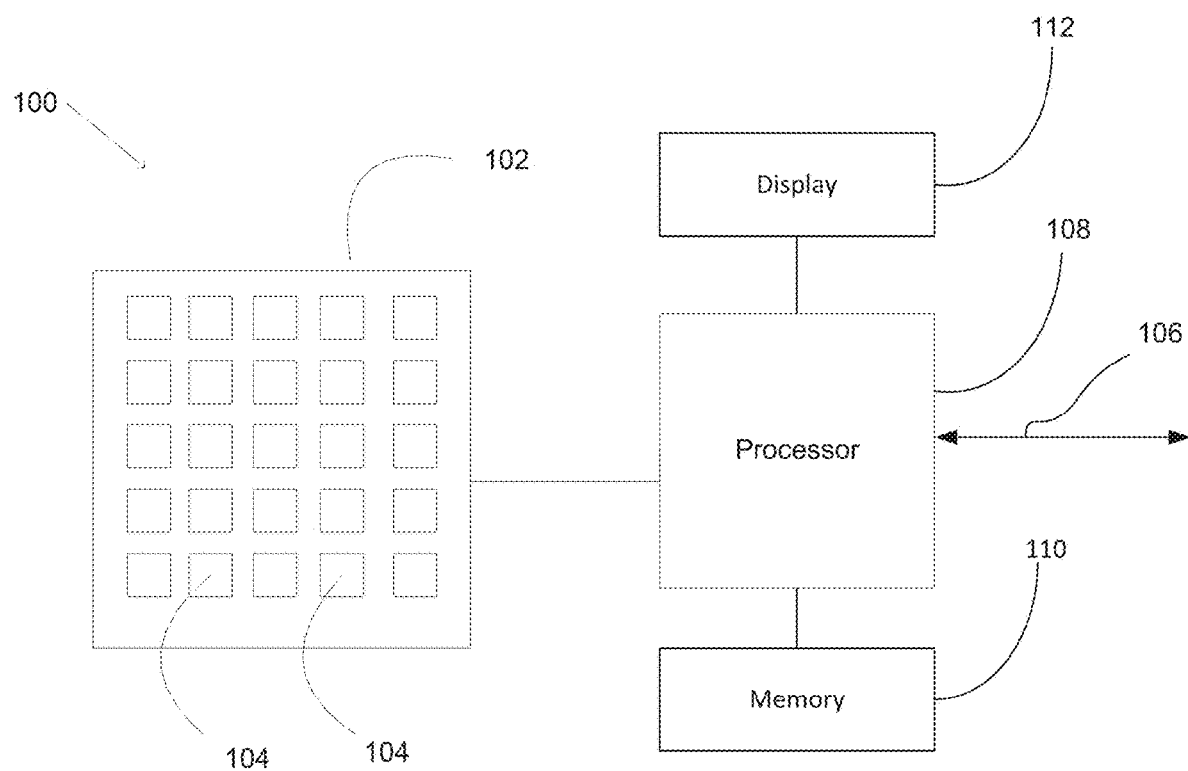
FIG. 1 conceptually illustrates an array camera in accordance with an embodiment of this invention.

Turning now to the drawings, systems and methods for performing a calibration process for an array camera in accordance with embodiments of the invention are illustrated. In accordance with many embodiments of the invention, at least one of the imaging components in the array camera is designated as a "master" or "reference" imaging component; and each of the remaining imaging components in the array is an associate imaging component. Each associate imaging component is associated with at least one of the reference imaging components. In several embodiments, a calibration process is performed to determine relevant characteristics of each reference imaging component including (but not limited to) colorimetric and photometric calibration processes, and/or determining scene independent geometric corrections that can be applied to the image data captured by the imaging component to account for distortions related to the mechanical construction of the imaging component. The process then determines relevant characteristics of each of the associate imaging components that are associated with a particular reference component. In a number of embodiments, the characteristics of the associate imaging components are determined with respect to the corresponding characteristics of the associated reference imaging component. In several embodiments, scene independent geometric corrections for the image data captured by an associate imaging component are determined by adjusting the image data captured by the associate image component for parallax and then comparing the parallax adjusted image data to a corrected image, where the corrected image is generated by applying the appropriate scene independent geometric corrections to the image data captured by the reference imaging component (i.e. the scene independent geometric corrections for the image data of the reference imaging component determined during the calibration of the reference imaging component). Systems and methods for calibrating array cameras in accordance with embodiments of the invention are discussed further below.

Capturing Light Field Image Data

A light field, which is often defined as a 4D function characterizing the light from all direction at all points in a scene, can be interpreted as a two-dimensional (2D) collection of data from 2D images of a scene. Array cameras, such as those described in U.S. patent application Ser. No. 12/935,504 entitled "Capturing and Processing of Images using Monolithic Array camera with Heterogeneous Imagers" to Venkataraman et al., can be utilized to capture light field images. In a number of embodiments, super resolution processes such as those described in U.S. patent application Ser. No. 12/967,807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution image data in the light field captured by the imaging components in an array camera. The terms high or higher resolution and low or lower resolution are used here in a relative sense and not to indicate the specific resolutions of the images captured by the array camera. The super resolution processing techniques described in U.S. patent application Ser. No. 12/967,807 can utilize a variety of calibration information including scene independent geometric corrections related to the distortions introduced by the construction of the imaging components utilized to capture the lower resolution image data. Scene independent distortions introduced by the imaging components of an array camera can limit the fidelity of a higher resolution image generated by super resolution imaging due to uncertainty concerning the relevant location within the scene of a piece of image data. By measuring the distortions during calibration, the uncertainty introduced by the distortions can be reduced, improving the performance of the super resolution process. In a similar manner, colorimetric and photometric variation between similar imaging components in a array camera can complicate image processing by increasing the difficulty of identifying similar points within a scene in the image data captured by the imaging components. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the imaging components in the array camera. A high resolution image synthesized using super resolution processing is synthesized from a specific viewpoint that can be referred to as a reference viewpoint. The reference viewpoint can be from the viewpoint of one of the imaging components in an array camera. Alternatively, the reference viewpoint can be an arbitrary virtual viewpoint.

Due to the different viewpoint of each of the imaging components, parallax results in variations in the position of foreground objects within the captured images of the scene. Processes for performing parallax detection are discussed in U.S. Provisional Patent Application Ser. No. 61/691,666 entitled "Systems and Methods for Parallax Detection and Correction in Images Captured Using Array Cameras" to Venkataraman et al., the disclosure of which is incorporated by reference herein in its entirety. As is disclosed in U.S. Provisional Patent Application Ser. No. 61/691,666, a depth map from a reference viewpoint can be generated by determining the disparity between the pixels in the images within a light field due to parallax. A depth map indicates the distance of the surfaces of scene objects from a reference viewpoint. In a number of embodiments, the computational complexity of generating depth maps is reduced by generating an initial low resolution depth map and then increasing the resolution of the depth map in regions where additional depth information is desirable such as (but not limited to) regions involving depth transitions and/or regions containing pixels that are occluded in one or more images within the light field.

During super resolution processing, a depth map can be utilized in a variety of ways. U.S. patent application Ser. No. 12/967,807 describes how a depth map can be utilized during super resolution processing to dynamically refocus a synthesized image to blur the synthesized image to make portions of the scene that do not lie on the focal plane to appear out of focus. U.S. patent application Ser. No. 12/967,807 also describes how a depth map can be utilized during super resolution processing to generate a stereo pair of higher resolution images for use in 3D applications. A depth map can also be utilized to synthesize a high resolution image from one or more virtual viewpoints. In this way, a rendering device can simulate motion parallax and dolly zoom. In addition to utilizing a depth map during super-resolution processing, a depth map can be utilized in a variety of post processing processes to achieve effects including (but not limited to) dynamic refocusing, generation of stereo pairs, and generation of virtual viewpoints without performing super-resolution processing.

Array Camera Architecture

Array cameras in accordance with embodiments of the invention are configured so that the array camera software can control the capture of light field image data and can capture the light field image data into a file that can be used to render one or more images on any of a variety of appropriately configured rendering devices. An array camera including an array of imaging components in accordance with an embodiment of the invention is illustrated in FIG. 1. The array camera 100 includes an array camera module 102, a processor 108, a memory 110 and a display 112. The array camera module 102 includes an array of imaging components 104 formed by a sensor and a lens stack array and the array camera module 102 is configured to communicate with a processor 108. The processor 108 is also configured to communicate with one or more different types of memory 110 that can be utilized to store image data and/or contain machine readable instructions utilized to configure the processor to perform processes including (but not limited to) the various processes described below. The processor 108 may also be connected to a network via a network connection 106 to communicate with other processing systems connected to the network. The display 112 can be utilized by the processor 108 to present a user interface to a user and to display an image rendered using the light field image data. Although the processor is illustrated as a single processor, array cameras in accordance with embodiments of the invention can utilize a single processor or multiple processors including (but not limited to) a graphics processing unit (GPU).

In the illustrated embodiment, the processor 108 receives image data generated by the array camera module 102 and reconstructs the light field captured by the array camera module 102 from the image data. Sensors including multiple focal planes that can be utilized in the construction of array camera modules are discussed in U.S. patent application Ser. No. 13/106,797 entitled "Architectures for System on Chip Array Cameras", to Pain et al., the disclosure of which is incorporated herein by reference in its entirety. The processor 108 can manipulate the light field in any of a variety of different ways including (but not limited to) determining the depth and visibility of the pixels in the light field and synthesizing higher resolution 20 images from the image data of the light field.

In the illustrated embodiment, the imaging components 104 are configured in a 5×5 array. Each imaging component 104 in the array camera module 102 is capable of capturing an image of the view. The sensor elements utilized in the imaging components 104 can be individual light sensing elements such as, but not limited to, traditional CIS (CMOS Image Sensor) pixels, CCO (charge-coupled device) pixels, high dynamic range sensor elements, multispectral sensor elements and/or any other structure configured to generate an electrical signal indicative of light incident on the structure. In many embodiments, the sensor elements of the imaging components 104 have similar physical properties and receive light via the same optical channel and color filter (where present). In other embodiments, the sensor elements of the imaging components 104 have different characteristics and, in many instances, the characteristics of the sensor elements are related to the color filter applied to each sensor element. In several embodiments, the sensor elements of an imaging component includes a plurality of rows of pixels that also form a plurality of columns of pixels and the pixels of each imaging component are contained within a region of the sensor that does not contain pixels from another imaging component.

In many embodiments, an array of images (i.e. a light field) is created using the image data captured by the imaging components 104. As noted above, the processor 108 in accordance with many embodiments of the invention are configured using appropriate software to take the image data within the light field and synthesize one or more high resolution images. In several embodiments, the high resolution image is synthesized from a reference viewpoint, typically that of a reference imaging component 104 within the array camera module 102. In many embodiments, the processor is able to synthesize an image from a virtual viewpoint, which does not correspond to the viewpoints of any of the imaging components 104 in the array camera module 102. Unless all of the objects within a captured scene are a significant distance from the array camera, the images in the light field will include disparity due to the different fields of view of the focal planes used to capture the images. Processes for detecting and correcting for disparity when performing super resolution processing in accordance with embodiments of the invention are discussed in U.S. Provisional Patent Application Ser. No. 61/691,666 (incorporated by reference above). The detected disparity can be utilized to generate a depth map. The high resolution image and depth map can be encoded and stored in memory 110 in a light field image file. The processor 108 can use the light field image file to render one or more high resolution images. The processor 108 can also coordinate the sharing of the light field image file with other devices (e.g. via a network connection), which can use the light field image file to render one or more high resolution images.

Although a specific array camera architecture is illustrated in FIG. 1, systems and methods for performing calibration of an array camera in accordance with embodiments of the invention may be performed on any array camera configuration appropriate to the requirements of a specific application. Systems and methods for performing a calibration process for an array camera in accordance with embodiments of the invention are discussed below.

Calibration Process for an Array Camera

An array camera has features beyond those in a conventional camera that are characterized during calibration to assist super resolution processing algorithms to produce images of a desired resolution. The information obtained during calibration can include a Field of View (FoV) for each of the imaging components in the array and other information that relates one or more imaging components to one another. In many embodiments, the calibration process determines parameters utilized by driver software to adjust the imaging component alignment data that drives normalization and parallax compensation processing in preparation for super resolution processing. Typically, this information is obtained by using the imaging components in the array to capture images of specialized charts. These calibration processes often involve significant physical space and substantial data management to obtain useful information. The space and data management requirements can be a problem in the manufacturing process of an array camera, where both physical space and data storage can be at a premium.

To reduce the amount of physical space needed and data storage requirements for calibration, processes for calibrating an array camera in accordance with many embodiments of the invention involve capturing an image of a test pattern with each of the imaging components in the array. The captured images can be utilized to calibrate a reference imaging component, generate a corrected image of the test pattern based upon calibration information for the reference component, and calibrate each of the associate imaging components associated with the reference component. In this way, calibration can be performed where the calibration of the associate imaging components is performed with respect to the associated reference component using the corrected image generated for the reference component.

Figure 2:
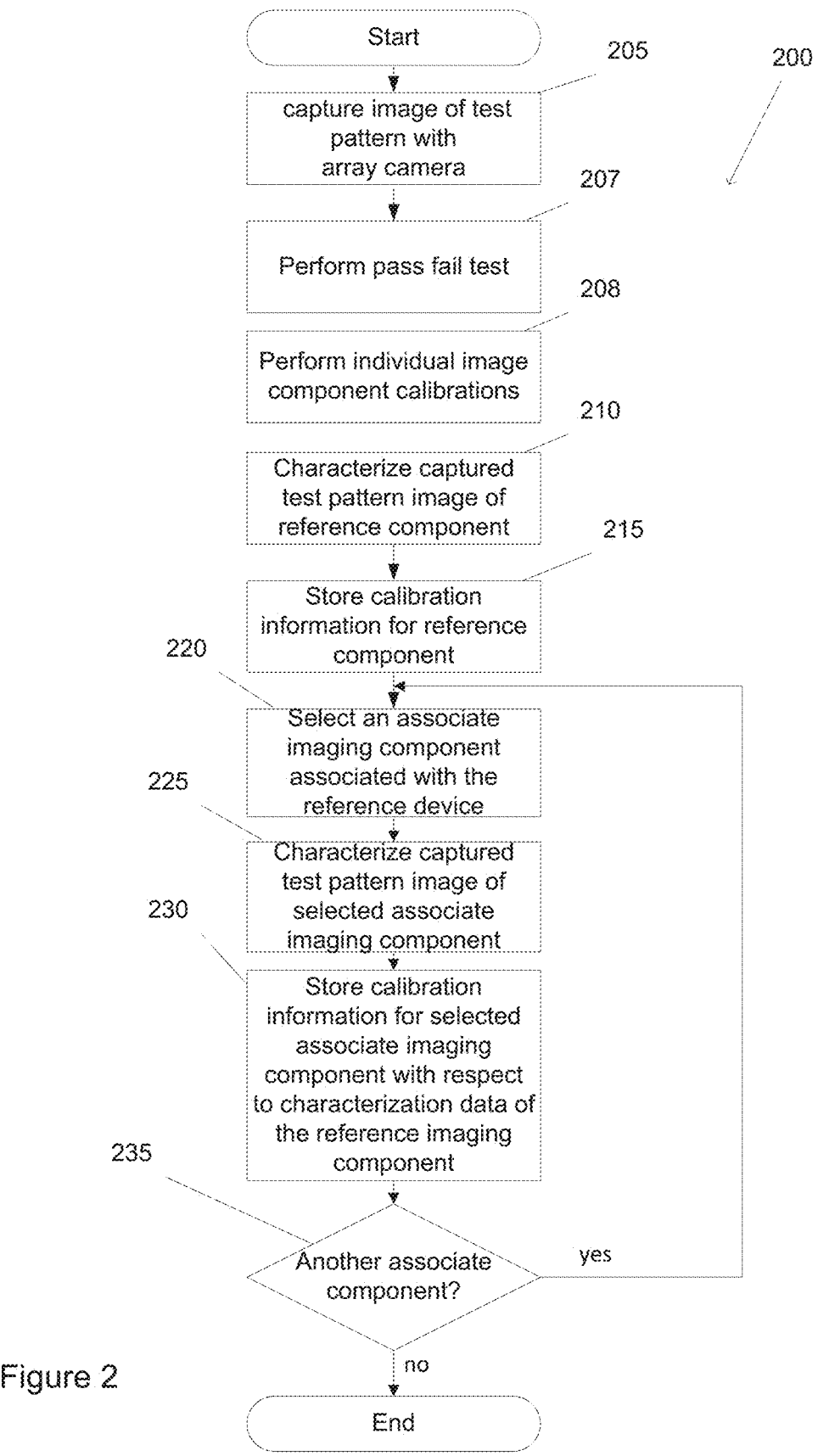
FIG. 2 illustrates a flow diagram of a calibration process for an array camera in accordance with an embodiment of this invention.

A process for calibrating an array camera in accordance with an embodiment of the invention is illustrated in FIG. 2. The process 200 includes capturing an image of a test pattern with the array camera (205). Each imaging component in the array camera captures an image of the test pattern. The test pattern has unique properties as discussed below with reference to FIG. 3. In many embodiments, the test pattern is placed at a distance farther away than 50% of the Hyperfocal (HF) distance of the array camera. In accordance with other embodiments, the test pattern is placed at a distance further away than 70% of the HF distance of the array camera. In accordance with still other embodiments, the test patent is a placed a distance from the array camera equal to the average of the HF distances of the individual lens stacks of the imaging components. In most embodiments, the HF distance will be in a range of 20-60 cm or 7.9-23.6 inches away from the array camera. One skilled in the art will recognize that the exact distance requirements will depend on the analysis methods used to calibrate the imaging components and the configuration of the array camera. In a number of the embodiments, the distance between the array camera and the test pattern is sufficient to produce a captured image of a checkerboard pattern with sufficient sharpness to determine a relative position of an object in the captured image to a fraction of a pixel. In some embodiments, the position may be determined within 0.5 of the pixel position or less. In other embodiments, the position may be determined within 0.25 of the pixel position or less. The distance between the array camera and the test pattern can also be used to determine the parallax shift between the imaging components to aid in determination of the relative spatial performance between the imaging components.

After the images are captured, the images captured by each of the imaging components may be stored in a memory and processed locally in real time or used by an off-line calibration process that can be performed by another processing system or by the processor in the array camera. Furthermore, the images of the test pattern captured by the imaging components in the array camera may be transmitted from the processor 108 of the array camera 100 to another processing system via a network connection 106 to allow the other processing system to perform the calibration process off-line. Various calibration processes that can be performed using the captured images in accordance with embodiments of the invention are discussed further below.

After each of the imaging components captures an image of the test pattern, some pass/fail tests may be performed (207) to provide gross operational sorting. The pass/fail tests may include but are not limited to, an image evaluation to verify proper image capture by the imaging components and/or to enable material sorting. The image evaluation may look for image levels within expected ranges, identify particular elements in each image such as fiducials (fiduciary markers) or edge detection in an expected area of the image. Failure to identify expected elements in a captured image may indicate a gross failure of the imaging component that captured the image. Other types of pass/fail test may also or alternatively be performed without departing from this invention.

Individual calibration processes may then be performed for each of the individual imaging components (208). These individual calibration processes may include, but are not limited, to colorimetric and photometric calibration processes. In accordance with some embodiments, a colorimetric calibration process is performed for each of the imaging components by evaluating Macbeth-style Color Checker patterns in the image of the test pattern captured by an imaging component. The values of these patterns in the image are compared to expected values and any deviation is identified and stored for use in the processing pipeline of the array camera. In accordance with some embodiments, the photometric calibration is performed in the following manner. The center of the image is identified based upon the relative brightness in the image. The center typically has the peak brightness of the image. The pixel data is then fitted to a cosineA4 curve using a least squares method. Photometric correction data is then determined by taking the difference between the fitted curve and the desired vignetting profile. The photometric correction data is then stored for use in the processing pipeline. Although specific colorimetric and photometric calibration processes are discussed above, any of a variety of colorimetric and/or photometric calibration processes can be utilized as appropriate to the requirements of specific applications in accordance with embodiments of the invention.

Characterization of the image of the test pattern captured by a reference imaging component in the array camera (210) is then performed to determine calibration information for the reference imaging component. A reference component is an imaging component in the array camera that is used as a reference for the calibration of one or more of the remaining associate imaging components in the array. In the described embodiment, the array camera only includes one reference component. However, an array camera may include more than one reference imaging component. When the array camera includes more than one reference imaging component, the characterization of the image of the test pattern (210) is repeated for images captured by each of the reference components. Various processes for characterization of the image of the test pattern captured by a reference component in accordance with embodiments of the invention are described below with reference to FIG. 4. The calibration information for the reference imaging component(s) is then stored (215).

After the image of the reference component(s) is characterized, a process for calibrating each of the associate imaging components associated with each reference imaging component can be performed. First, an associate imaging component associated with the reference component is selected (220). The test pattern image captured by the selected associate imaging component is characterized (225) to determine calibration information for the associate imaging component with respect to the reference imaging component. In many embodiments, the calibration information includes scene independent geometric corrections to account for distortions introduced by the mechanical construction of each imaging component. The calibration information is then stored for the selected associate imaging component (230). The process then determines whether the array camera includes another associate imaging component associated with the reference component (235). If there is another imaging component from the array camera associated with the reference component, the process (220-235) is repeated for the next associate imaging component. If there are no other associated imaging components associated with the reference component, process 200 ends. In some embodiments with more than one reference component, calibration of associate imaging components (220-235) is repeated for each particular reference component and the associate components associated with the particular reference component until the calibration process has been performed for all of reference imaging components and its associated associate components in the array camera.

Figure 3:
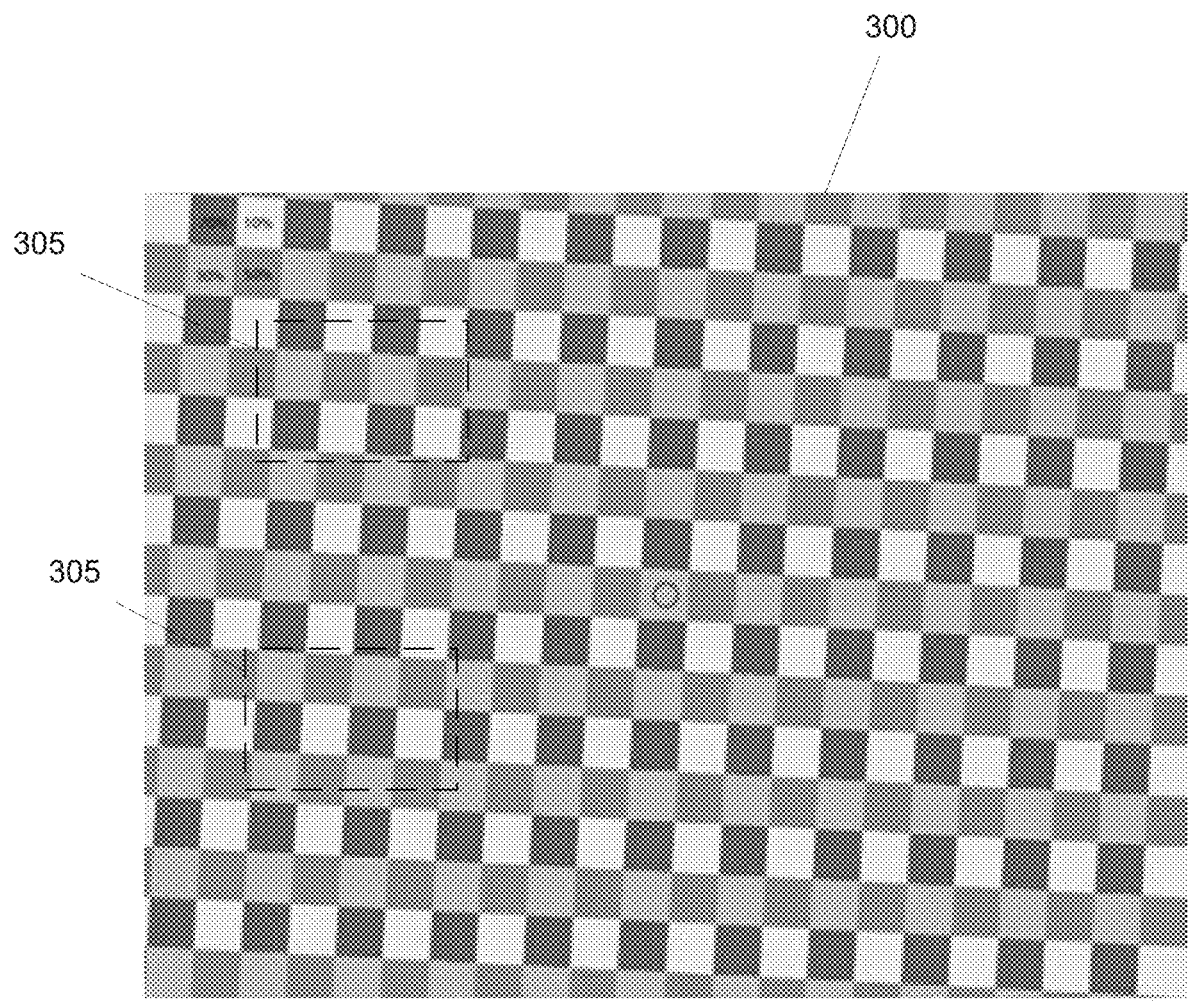
FIG. 3 illustrates a test pattern for use in a calibration process for an array camera in accordance with an embodiment of this invention.

A test pattern that can be used in a calibration process in accordance with embodiments of this invention is illustrated in FIG. 3. The test pattern 300 has a low contrast slanted edge pattern. As shown, the test pattern 300 has a checkerboard pattern providing the low contrast slanted edge pattern. The test pattern 300 changes with a high enough frequency to provide a sufficient number of correlation points to identify an expected level of low-frequency non-uniformities in the optical systems of the imaging components. Macbeth Color Chart patterns 305 are inset at different positions in the test pattern 300 to enable color uniformity checks. In accordance with some embodiments, the test pattern 300 may not include other fiducial elements as the slant edge intersections provide a sufficient number of identifiable points to perform the calibration process.

Characterization of an Image of a Test Pattern

Figure 4:
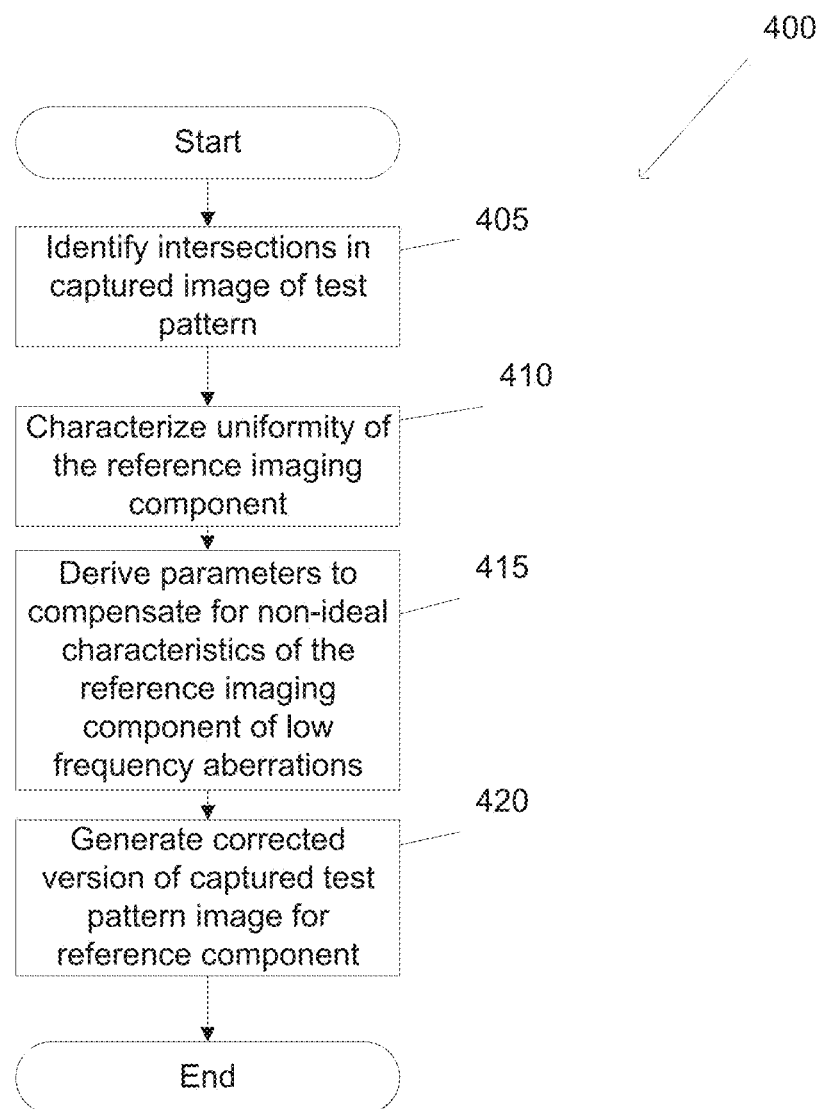
FIG. 4 illustrates a flow diagram of a process for calibrating a reference imaging component in accordance with embodiments of this invention.

A process for characterization of an image of the test pattern captured by a reference imaging component to determine the calibration information for the reference component in accordance with embodiments of this invention is illustrated in FIG. 4. The process includes identifying intersections of the test pattern in the captured image (405), characterizing uniformity of the reference camera (410), deriving parameters to compensate for low frequency aberrations (415), and generating a corrected version of captured image of the test pattern (420).

The identification of the intersections of the test pattern in the captured image (405) is performed by determining the pixel positions of the intersections in the test pattern in the captured image using a conventional corner-detection algorithm such as, the Harris corner detector or the Shi and Tomasi minimum eigenvalue method. In accordance with some embodiments, the intersection points are determined to sub-pixel accuracy. In some of these embodiments, the position of the intersection points is determined to an accuracy of 0.5 of a pixel position or less. In other of these embodiments, the position of the intersection points is determined to an accuracy of 0.25 of a pixel position or less. In other of these embodiments, position is determined to an accuracy of 0.1 of a pixel position or better.

The positions of the intersections in the test pattern are then used to characterize the uniformity of the reference component (410) included in the calibration information for the reference component. The uniformity of the reference imaging component is characterized with respect to the "as-designed" performance of the reference imaging component. The characterization is performed by comparing the determined points to an expected placement based on the test pattern. The comparisons are used to measure image translation (due to the imaging component), radial geometric distortion and other residual geometric perturbations. Correction parameters are then derived to compensate for the measured distortions. In many embodiments the correction parameters are scene independent geometric corrections that are applied to image data captured in specific pixel locations by the reference imaging component.

The positions of intersection points of the test patterns are then used in deriving parameters to compensate for low frequency aberrations (420) to include these parameters in the calibration information. These parameters include, but are not limited to, X and Y translations to correct for imager rotation; a $3^{rd}$-order radial translation to correct pin-cushion or barrel distortions; and/or a $5^{th}$-order radial translation to correct mustache or wave distortions. In other embodiments, any of a variety of parameters can be determined to correct for any of a number of different distortions as appropriate to the requirements of a specific application.

The calibration information including the characterization information and compensation parameters are then used to manipulate the captured image of the test pattern to generate a corrected image of the test pattern (425). The corrected image can be used to calibrate each of the associate imaging components associated with the reference imaging component. Process 400 then ends.

Calibrating an Associate Imaging Component

Figure 5:
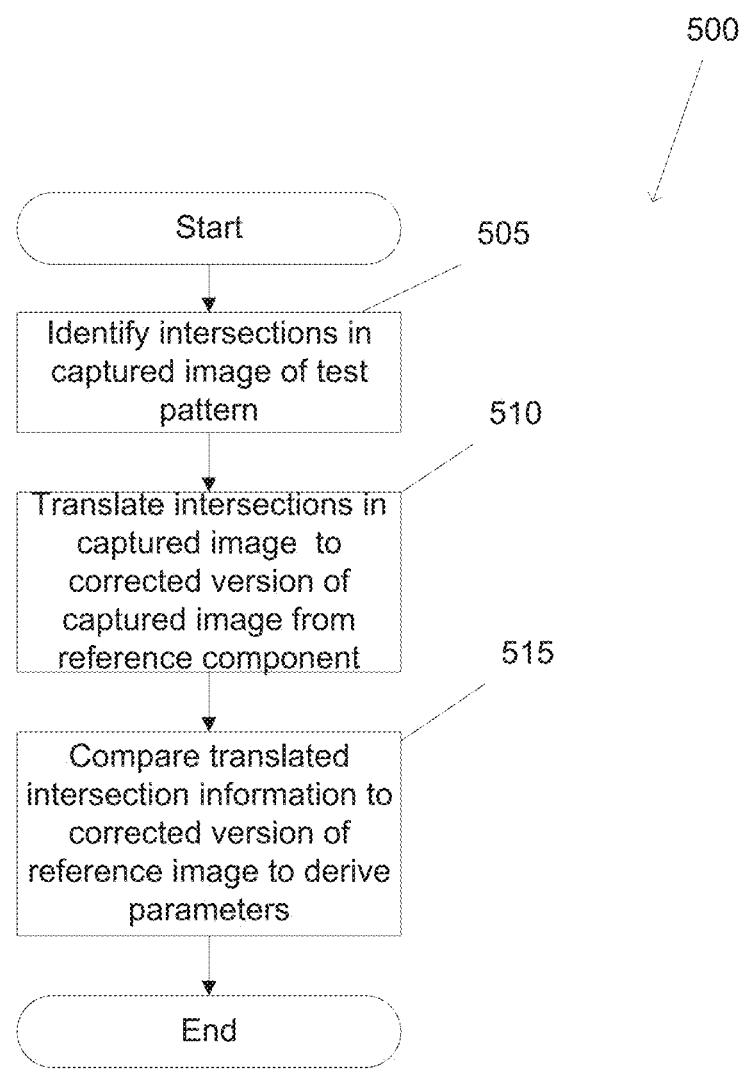
FIG. 5 illustrates a flow diagram of a process for calibrating an associate imaging component with respect to a reference imaging component in an array camera in accordance with embodiments of this invention.

A process for calibrating an associate imaging component using a corrected image of the test pattern derived from the calibration of the reference component to which the associated component is associated in accordance with embodiments of this invention is illustrated in FIG. 5. Process 500 includes identifying the positions of the intersections in the test pattern in the image captured by the associate imaging component (505), translating the positions of identified intersection points to account for the expected parallax shift between the associate imaging component and the reference imaging component (510), and comparing the translated positions of intersection points to the positions of the intersection points in the corrected image of the test pattern of the reference component to derive scene independent geometric correction data included in the calibration information for the associate imaging component (515).

The identification of positions of the intersections of the test pattern in the captured image (505) is performed by determining the positions of the intersections using a conventional alignment algorithm such as those described above. In accordance with some embodiments, the positions of the intersections are determined to sub-pixel accuracy. In some of these embodiments, the position of the intersection points is determined to an accuracy of 0.5 of a pixel position or less. In other of these embodiments, the position of the intersection points is determined to an accuracy of 0.25 of a pixel position or less. In still other of these embodiments, the position of the intersection points is determined to an accuracy of 0.1 of a pixel position or less.

The position of the identified intersection points are then translated to account for the expected parallax shift between the associate imaging component and the reference imaging component (510). The expected parallax shift is based upon the sensor design parameters, the behavior of the particular sensor optics, and calibration test parameters. The sensor design parameters include, but are not limited to, the physical offset of the particular associated imaging component to the reference imaging component. The behavior of the sensor optics includes, but is not limited to, the radial distortion of the relative parallax shift from a strictly rectilinear translation. The calibration test parameters include, but are not limited to, the distance of the test pattern from the array camera when the image is captured.

The comparison of the translated positions of the identified intersections for the associate component image to positions of corresponding intersection points in the corrected image of the reference imaging component (515) is performed. X and Y offset information for each identified intersection is determined relative to the position of the intersection in the corrected image. The X and Y offset information for all of the intersection positions for the reference imaging component can then be used to create scene independent geometric correction information. The correction information may be represented by a grid that provides a geometric correction prescription for the pixels of the associate imaging component to derive the appropriate parameters for the associate imaging component. The calibration information including the appropriate parameters can then be used during normal operation to correct distortions in the image data captured by the associate imaging component.

Although specific processes are described above with respect to FIGS. 4 and 5 with respect to determining scene independent geometric corrections during the calibration or reference and associate imaging components in an array camera, any of a variety of processes can be utilized to determine scene independent geometric corrections as appropriate to the requirements of a specific application in accordance with embodiments of the invention.

While the above description contains many specific embodiments of the invention, these should not be construed as limitations on the scope of the invention, but rather as an example of embodiments thereof. Accordingly, the scope of the invention should be determined not by the embodiments illustrated, but by the appended claims and their equivalents.

What is claimed:

1. A method for synthesizing an image, comprising:
generating image data using a camera, where the image data comprises an image of a scene from a first viewpoint; and
warping the image data using calibration data to obtain warped image data, where:
the warped image data comprises a synthesized image of the scene from a reference viewpoint; and
the calibration data comprises scene independent geometric corrections that shift pixel positions of the image data of the scene from the first viewpoint to pixel positions in an image of the scene from the reference viewpoint, where the scene independent geometric corrections are generated by:
capturing a first calibration image and a second calibration image of a pattern using the camera and a reference camera, respectively;
identifying positions of a set of features in the pattern in the first calibration image;
identifying positions of the set of features in the pattern in the second calibration image;
translating the positions of the set of features to account for expected parallax shift between the camera and the reference camera;
calculating offsets for each feature in the set of features, wherein the calculating of the offsets is based at least in part on a comparison of the translated positions of the set of features and the identified positions of the set of features in the first calibration image; and
generating the scene independent geometric corrections based on the offsets.

2. The method of claim 1, further comprising storing the warped image data in an image file.

3. The method of claim 1, wherein the calibration data comprises scene independent geometric corrections for the camera with respect to the reference viewpoint.

4. The method of claim 3, wherein the camera is one camera of an array of cameras, where each camera of the array of cameras has a viewpoint different from the reference viewpoint.

5. The method of claim 4, wherein a first camera and a second camera of the array of cameras have different imaging characteristics.

6. The method of claim 5, wherein the imaging characteristics comprise field of view.

7. The method of claim 4, wherein at least two cameras in the array of cameras do not contain overlapping fields of view.

8. The method of claim 4, wherein the array of cameras is arranged in a 5×5 array.

9. The method of claim 1, further comprising generating a depth map based on the image data.

10. The method of claim 9, further comprising storing the depth map in an image file in association with the warped image data.

11. The method of claim 9, wherein the depth map is further generated based on additional image data captured from a second camera having a second viewpoint.

12. The method of claim 1, wherein the set of features comprises intersections in the pattern.

13. The method of claim 1, further comprising:
obtaining image data from each camera of an array of cameras, where the array of cameras comprises the camera, and where each camera in the array of cameras has a different viewpoint;
wherein the warped image data comprises warped image data from each camera of the array of cameras.

14. The method of claim 13, wherein the warped image has a higher resolution than any given image data from the array of cameras.

15. A camera system, comprising:
a camera having a viewpoint;
a processor communicatively coupled to the camera; and
a memory communicatively coupled to the processor, where the memory stores machine readable instructions that configure the processor to:
capture image data from the camera; and
warp the image data using calibration data to obtain warped image data, where:
the warped image data comprises a synthesized image of a scene from a reference viewpoint; and
the calibration data comprises scene independent geometric corrections that shift pixel positions of the image data of the scene from the viewpoint to pixel positions in an image data of the scene from the reference viewpoint, where the scene independent geometric corrections are generated by:
capturing a first calibration image and a second calibration image of a pattern using the camera and a reference camera, respectively;
identifying positions of a set of features in the pattern in the first calibration image;
identifying positions of the set of features in the pattern in the second calibration image;
translating the positions of the set of features to account for expected parallax shift between the camera and the reference camera;
calculating offsets for each feature in the set of features, wherein the calculating of the offsets is based at least in part on a comparison of the translated positions of the set of features and the identified positions of the set of features in the first calibration image; and
generating the scene independent geometric corrections based on the offsets.

16. The camera system of claim 15, further comprising an array of cameras, where the camera is the array of cameras, and where each camera in the array of cameras has a viewpoint different from the reference viewpoint.

17. The camera system of claim 16, where the machine readable instructions
further configure the processor to:
capture image data from each camera of the array of cameras; and
warp the image data from each camera of the array of cameras to the reference viewpoint using the calibration data, where the calibration data further comprises scene independent geometric corrections that shift pixel positions of the image data of the scene from the viewpoint of each camera in the array of cameras to pixel positions in an image data of the scene from the reference viewpoint.

18. The camera system of claim 16, where a first camera and a second camera of the array of cameras have different imaging characteristics.

19. The camera system of claim 15, where the machine readable instructions further configure the processor to generate a depth map based on the image data.

* * * * *